(12) United States Patent
Takabatake

(10) Patent No.: US 8,526,065 B2
(45) Date of Patent: Sep. 3, 2013

(54) CONTACT-TYPE IMAGE READING APPARATUS

(75) Inventor: Masanari Takabatake, Ishikawa (JP)

(73) Assignee: PFU Limited, Ishikawa (JP)

( * ) Notice: Subject to any disclaimer, the term of this patent is extended or adjusted under 35 U.S.C. 154(b) by 190 days.

(21) Appl. No.: 13/047,138

(22) Filed: Mar. 14, 2011

(65) Prior Publication Data
US 2011/0249301 A1 Oct. 13, 2011

(30) Foreign Application Priority Data
Apr. 13, 2010 (JP) ................................ 2010-092535

(51) Int. Cl.
*H04N 1/00* (2006.01)
*H04N 1/04* (2006.01)

(52) U.S. Cl.
USPC .......................................... 358/408; 358/474

(58) Field of Classification Search
USPC ................. 358/408, 505–507, 474–476, 501, 358/401
See application file for complete search history.

(56) References Cited

U.S. PATENT DOCUMENTS

| | | | |
|---|---|---|---|
| 2002/0105686 A1* | 8/2002 | Hasegawa et al. | 358/498 |
| 2006/0146380 A1* | 7/2006 | Budelsky et al. | 358/509 |
| 2007/0211313 A1* | 9/2007 | Kurokawa et al. | 358/498 |
| 2008/0158602 A1* | 7/2008 | Nakai | 358/1.16 |
| 2009/0097080 A1* | 4/2009 | Kim | 358/497 |

FOREIGN PATENT DOCUMENTS

| | | |
|---|---|---|
| JP | 05-145699 | 6/1993 |
| JP | 2000-183323 | 6/2000 |
| JP | 2001-022010 | 1/2001 |
| JP | 2005-115661 | 4/2005 |
| JP | 2007-226045 | 9/2007 |
| JP | 2008-113388 | 5/2008 |

* cited by examiner

*Primary Examiner* — Douglas Tran
(74) *Attorney, Agent, or Firm* — McDermott Will & Emery LLP

(57) ABSTRACT

A contact-type image reading apparatus includes two image reading units each of which has light-receiving elements arranged two-dimensionally for reading an image on an original in two-dimensional directions, a first body unit which includes one of the two image reading units as a first image reading unit, and a second body unit which includes the other image reading unit as a second image reading unit disposed so as to be openable and closable with respect to the first body unit for sandwiching the original therebetween when the second body unit is closed.

When the second body unit is closed, the second body unit is closed with respect to a surface where the first image reading unit is provided in the first body unit, and the second image reading unit is disposed to face the first image reading unit.

7 Claims, 13 Drawing Sheets

CONTACT-TYPE IMAGE READING APPARATUS

BACKGROUND OF THE INVENTION

1. Field of the Invention

The present invention relates to a contact-type image reading apparatus.

2. Description of the Related Art

An image reading apparatus includes a light-receiving element that converts detected light into an electrical signal, and electrically processes an image of an original by detecting light, by the light-receiving element, reflected by the original from which the image is read and converting the reflected light into an electrical signal. In conventional image reading apparatuses that detect the light reflected by the original by the light-receiving element in this manner, some of them cause an image reading unit to come into close contact with the original when the image on the original is read by the image reading unit provided with the light-receiving element, ensure sharpness when the image on the original is read, and achieve a more compact size of the entire apparatus.

For example, in an image read/display device described in Japanese Patent Application Laid-open No. 2005-115661, an original is set on a display unit and an image on the original is read by an image reading unit in a state where the original is sandwiched between the display unit and the image reading unit. This does not require a drive mechanism when the original is to be read, and it is thereby possible to achieve a more compact and thinner device, prevent the display unit and the image reading unit from damaging each other during transportation because both of them are provided facing each other, and improve portability of the device.

In an image read/display device described in Japanese Patent Application Laid-open No. H05-145699, an image sensor being an image reading unit and an LCD (Liquid Crystal Display) being a display unit are provided so as to be openable and closable, and the image sensor and an original retainer plate are also provided so as to be openable and closable. When an image of an original is to be read by the image sensor, the original is sandwiched between the image sensor and the original retainer plate, so that the original is read. This allows the image sensor and the LCD to be overlapped, thereby achieving a more compact size of the device.

Here, when an image of an original is to be read by an image reading unit, there is a case where not only one side bur also both sides of the original may be read. In the case where the both sides of the original are to be read, generally, one of the sides is first read by an image reading unit, then the original is turned over, and the other side is read by the image reading unit. However, when the both sides of the original are to be read, the turning over the original in this manner is required, or the reading operation of the original has to be carried out twice, which causes the operation at the time of reading to be troublesome.

SUMMARY OF THE INVENTION

It is an object of the present invention to at least partially solve the problems in the conventional technology.

According to an aspect of the present invention, a contact-type image reading apparatus includes two image reading units each of which includes light-receiving elements arranged two-dimensionally for reading an image on an original in two-dimensional directions, a first body unit that includes one of the two image reading units as a first image reading unit, and a second body unit that includes the other image reading unit as a second image reading unit, the second body unit being disposed so as to be openable and closable with respect to the first body unit for sandwiching the original between the first body unit and the second body unit when the second body unit is closed with respect to the first body unit, wherein the second body unit is closed with respect to a surface where the first image reading unit is provided in the first body unit when the second body unit is closed with respect to the first body unit, and the second image reading unit is disposed to face the first image reading unit when the second body unit is closed with respect to the first body unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the contact-type image reading apparatus according to the present invention will be explained in detail below with reference to the accompanying drawings. It should be noted that the present invention is not limited by the embodiments. In addition, constituent elements in the following embodiments include those which are replaceable and easily made by persons skilled in the art or substantially equivalents.

First Embodiment

Figure 1:
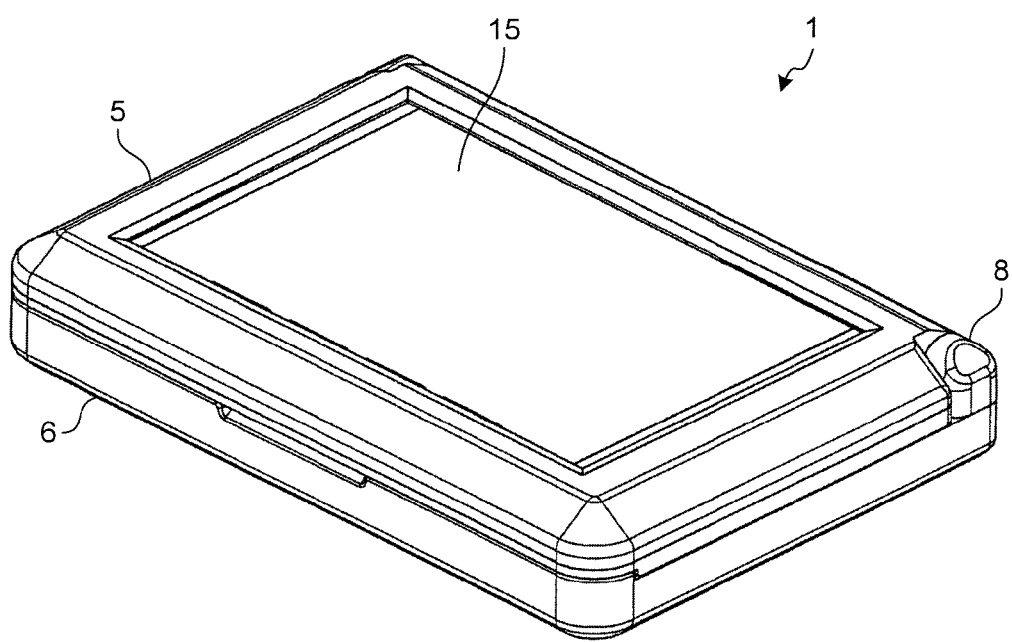
FIG. 1 is a schematic representing an external appearance of a contact-type image reading apparatus according to a first embodiment, which shows a closed state of a cover unit.
Figure 2:
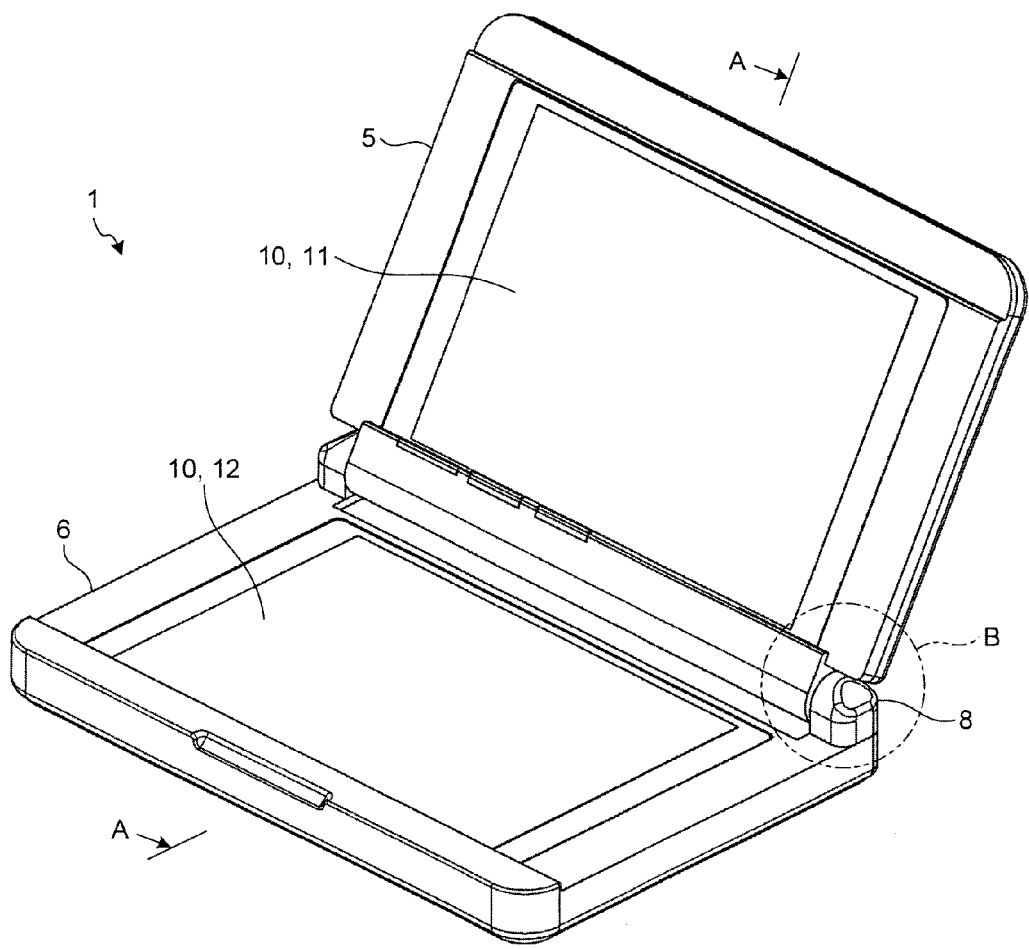
FIG. 2 is a schematic representing an open state of the cover unit of the contact-type image reading apparatus shown in FIG. 1.

FIG. 1 is a schematic representing an external shape of a contact-type image reading apparatus according to a first embodiment, and shows a state where a cover unit of the contact-type image reading apparatus is closed. FIG. 2 is a schematic representing a state where the cover unit of the contact-type image reading apparatus shown in FIG. 1 is opened. A contact-type image reading apparatus 1 shown in this figure includes a cover unit 5 being a first body unit and a body unit 6 being a second body unit both of which are formed into a thin and substantially rectangular shape or into a substantially board-like shape. The cover unit 5 and the body unit 6 are connected to each other along respective one sides of the both units by a hinge 8. Thus, the cover unit 5 and the body unit 6 can be relatively opened and closed. Two image reading units 10 that read images are arranged in the contact-type image reading apparatus, such that one is arranged in the cover unit 5 and the other is arranged in the body unit 6. A first image reading unit 11 being one of the two image reading units 10 is arranged in the cover unit 5, and a second image reading unit 12 being the other image reading unit 10 is arranged in the body unit 6. More specifically, in the cover unit 5, the first image reading unit 11 is provided on the surface thereof which faces the body unit 6 when the cover unit 5 is closed, i.e., the first image reading unit 11 is provided on the body unit 6 side of the cover unit 5. And in the body unit 6, the second image reading unit 12 is provided on the surface thereof which faces the cover unit 5 when the cover unit 5 is closed, i.e., the second image reading unit 12 is provided on the cover unit 5 side of the body unit 6. These first image reading unit 11 and second image reading unit 12 are arranged at a position where the first image reading unit 11 and second image reading unit 12 overlap when the cover unit 5 and the body unit 6 are closed. In other words, the body unit 6 is relatively openable and closable with respect to the cover unit 5, and the second image reading unit 12 is provided at a position where, when the body unit 6 is to be relatively closed with respect to the cover unit 5, the second image reading unit 12 closes with respect to the surface of the cover unit 5, and where, when the body unit 6 is relatively closed with respect to the cover unit 5, the second image reading unit 12 faces the first image reading unit 11.

Provided in the cover unit 5 is an image display unit 15 on the surface of the opposite side to the side where the first image reading unit 11 is disposed. The image display unit 15 includes a liquid crystal display panel for displaying an arbitrary image thereon. The image display unit 15 also includes a so-called touch panel therein for enabling an input operation through the image display unit 15 by touching the image display thereon. Namely, the image display unit 15 includes a liquid crystal panel with the touch panel. Therefore, the image display unit 15 also has a function as an operation input unit, for example, a function as a start button with which an instruction is input when imaging of the original is started.

Moreover, the cover unit 5 and the body unit 6 are provided with an open/close detection mechanism (not shown) including a sensor such as a mechanical sensor, a magnetic sensor, or an optical sensor, for detecting open/close of the both units.

Figure 3:
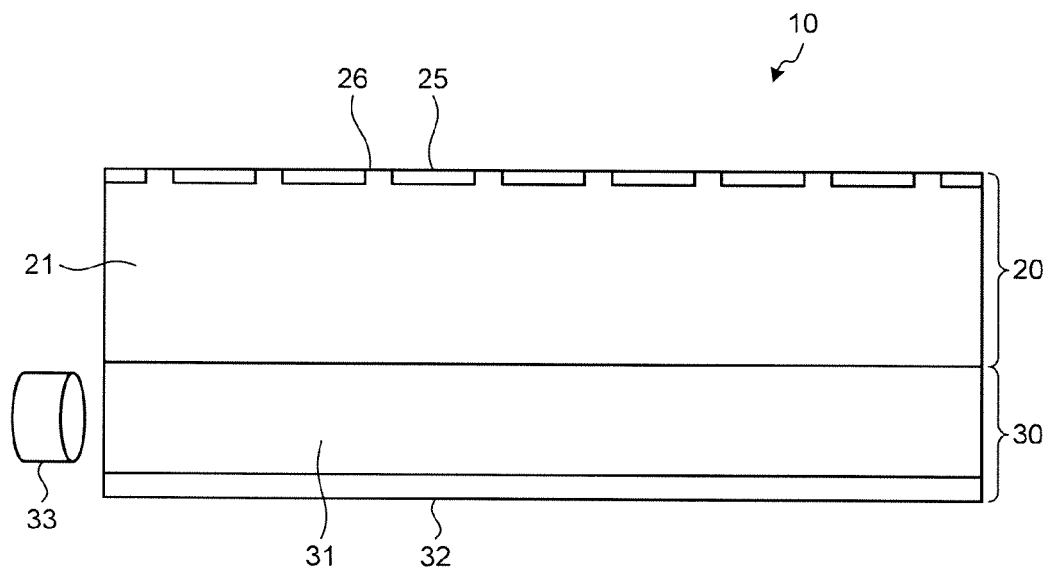
FIG. 3 is a cross-sectional view of a configuration of the image reading unit shown in FIG. 2.

FIG. 3 is a cross-sectional view of a configuration of the image reading unit shown in FIG. 2. The image reading units 10 included in the first image reading unit 11 and the second image reading unit 12 have substantially the same configuration as shown in FIG. 3. The image reading unit 10 includes a backlight 30, a transparent glass substrate 21 laminated on the backlight 30, and a plurality of light-receiving elements 25, which are light receivers arranged in a two-dimensional array at predetermined intervals on the glass substrate 21, laminated on the glass substrate 21. Among these devices, the light-receiving elements 25 are arranged on the glass substrate 21, or to be more precisely, the light-receiving elements 25 are arranged on the surface of the glass substrate 21 in the side opposite to the side where the backlight 30 is located. Each of the image reading units 10 included both in the first image reading unit 11 and the second image reading unit 12 includes a two-dimensional contact-type area sensor, and thereby employed as a two-dimensional contact-type image reading unit 10.

The backlight 30 includes LEDs (Light Emitting Diodes) 33 as a light source, a light guide plate 31 for guiding lights emitted by the LEDs 33 to the entire glass substrate 21, and a light reflector 32. As explained above, the image reading unit 10, using the LEDs 33 as the light source, is provided with the LEDs 33 emitting three colors, i.e., R (Red), G (Green), and B (Blue), sequentially to read images, and synthesizes the read images, thus obtaining a color image. It should be noted that color image is also available by providing RGB color filters in the light-receiving elements 25 instead of using the LED 33 with the RGB three colors.

In the contact-type image reading apparatus 1 according to the first embodiment, the LEDs 33 are used as the light source provided in the backlight 30. However, any device other than the LEDs 33 may be used as the light source, for example, a light source such as a CCFL (Cold Cathode Fluorescent Lamp) may be used.

The backlight 30 is provided on the side opposite to the side where the light-receiving elements 25 are arranged in the glass substrate 21. The backlight 30 allows the lights emitted by the LEDs 33 to be guided to the entire glass substrate 21 by the light guide plate 31 and the light reflector 32 when the LEDs 33 are lighted. The glass substrate 21 is formed with a transparent material. Because of these, when the LEDs 33 are lighted or when the backlight 30 is lighted, the light emitted from the backlight 30 is transmitted through the glass substrate 21 and is irradiated through spaces between the light-receiving elements 25 in a direction opposite to the side where the backlight 30 is located, with respect to the glass substrate 21.

Thus, each of the spaces between the light-receiving elements 25 arranged on the transparent glass substrate 21 is provided as a light-emitting portion 26 that emits light, emitted from the backlight 30, in a direction opposite to the side of the glass substrate 21 where the backlight 30 is located, when the backlight 30 is lighted. More specifically, because the light-receiving elements 25 arranged on the glass substrate 21 are spaced, light-emitting portions 26 are arranged around the light-receiving elements 25 respectively. In this manner, the light-receiving elements 25 are arranged on the glass substrate 21 and the light-emitting portions 26 are also arranged thereon, and therefore, a layer composed of the glass substrate 21 including the light-receiving elements 25 is provided as a light-receiving/emitting layer 20 capable of receiving and emitting light.

The image reading unit 10 formed in this manner is configured to receive the light reflected on the original by the light-receiving elements 25 arranged in the light-receiving/emitting layer 20 and thereby capable of reading the image on the original. Therefore, when the image on the original is read by the image reading unit 10, the image is read by the surface on the side where the light-receiving elements 25 are arranged in the image reading unit 10. Moreover, the image reading unit 10 includes the backlight 30, for emitting an irradiation light for irradiating the original, provided on the opposite side to the surface on the side where the image on the original is read.

Figure 4:
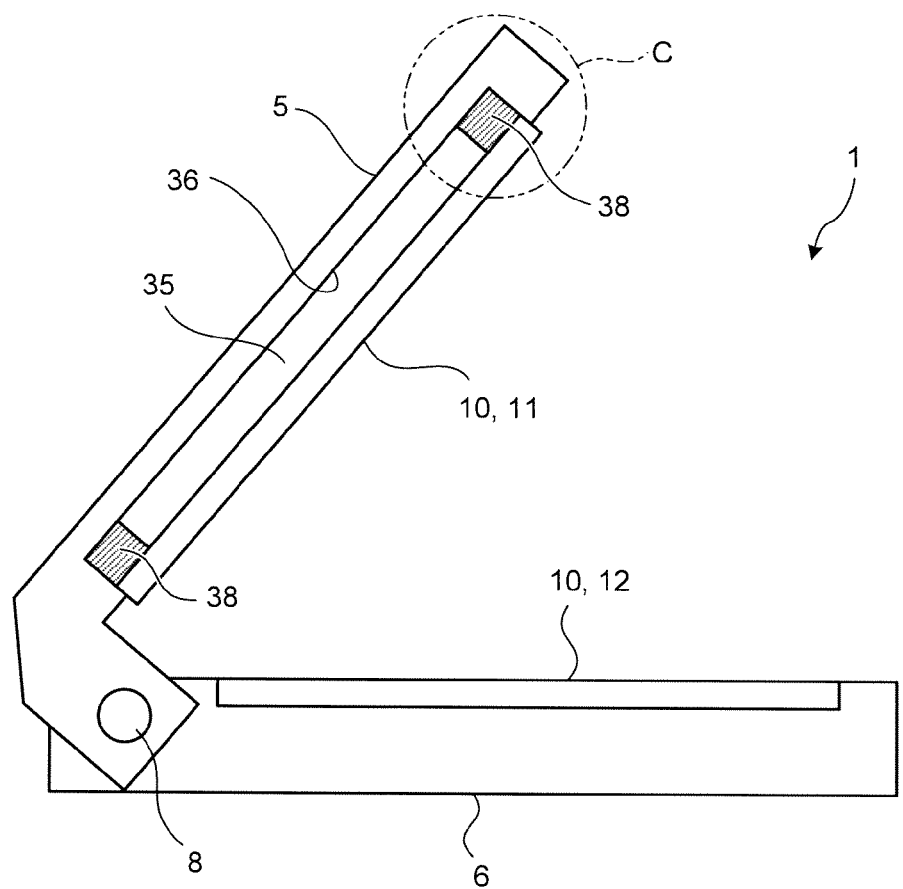
FIG. 4 is an A-A cross-sectional view of FIG. 2.
Figure 5:
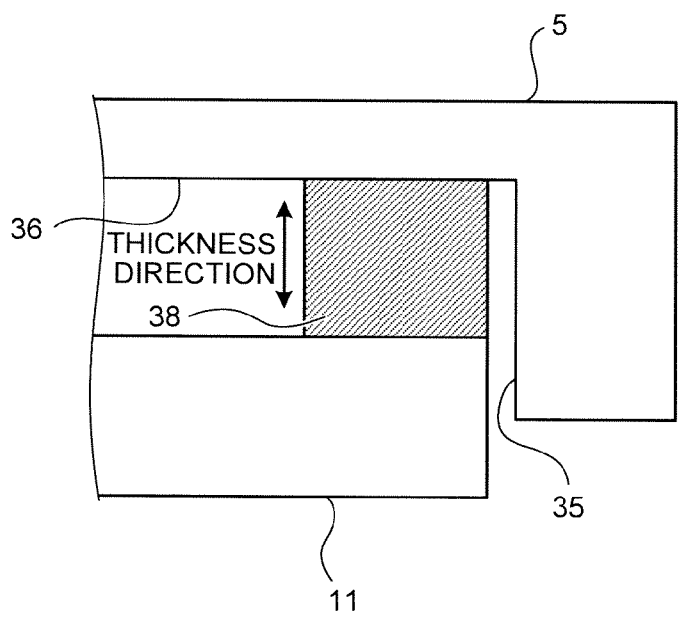
FIG. 5 is a detail view of the C portion of FIG. 4.

FIG. 4 is an A-A cross-sectional view of FIG. 2. FIG. 5 is a detail view of the C portion of FIG. 4. The cover unit 5 is provided with the first image reading unit 11. In the cover unit 5, an image-reading-unit mounting portion 35 being a portion where the first image reading unit 11 is mounted is formed, and the first image reading unit 11 is mounted on the cover unit 5 through a cushion material 38 which is an elastic member internally provided in the image-reading-unit mounting portion 35. More specifically, the image-reading-unit mounting portion 35 is formed into a recess whose shape, when the first image reading unit 11 is viewed from the direction of the body unit 6, has a predetermined depth and a size slightly larger than that of the first image reading unit 11. The cushion material 38 is arranged in plurality in a bottom portion 36 of the image-reading-unit mounting portion 35 formed into the recess in this manner, and the first image reading unit 11 is mounted on the cushion materials 38.

The cushion materials 38 arranged in the image-reading-unit mounting portion 35 as described above are formed of a material, such as polyurethane or rubber material, which can be elastically deformed and has elasticity. The first image reading unit 11 has a form being a substantially rectangular shape when the first image reading unit 11 is viewed from the direction of the body unit 6, and the cushion materials 38 are arranged in the vicinity of four corners of the first image reading unit 11 and on the surface of the opposite side to the side where the body unit 6 is located. More specifically, the cushion materials 38 are arranged between the bottom portion 36 of the image-reading-unit mounting portion 35 and the first image reading unit 11 so as to support the first image reading unit 11. The first image reading unit 11 is mounted in the image-reading-unit mounting portion 35 through the cushion materials 38 in such a manner that at least a part of the image reading unit 11 is positioned inside the image-reading-unit mounting portion 35.

Because the image reading unit 11 is mounted in the image-reading-unit mounting portion 35 through the cushion materials 38 which can be elastically deformed, when load is applied to the image reading unit 11, the image reading unit 11 can move in a state where it is supported by the cushion materials 38 due to elastic deformation of the cushion materials 38. The image reading unit 11 is provided with a floating structure that can move by the load applied to the image reading unit 11.

Figure 6:
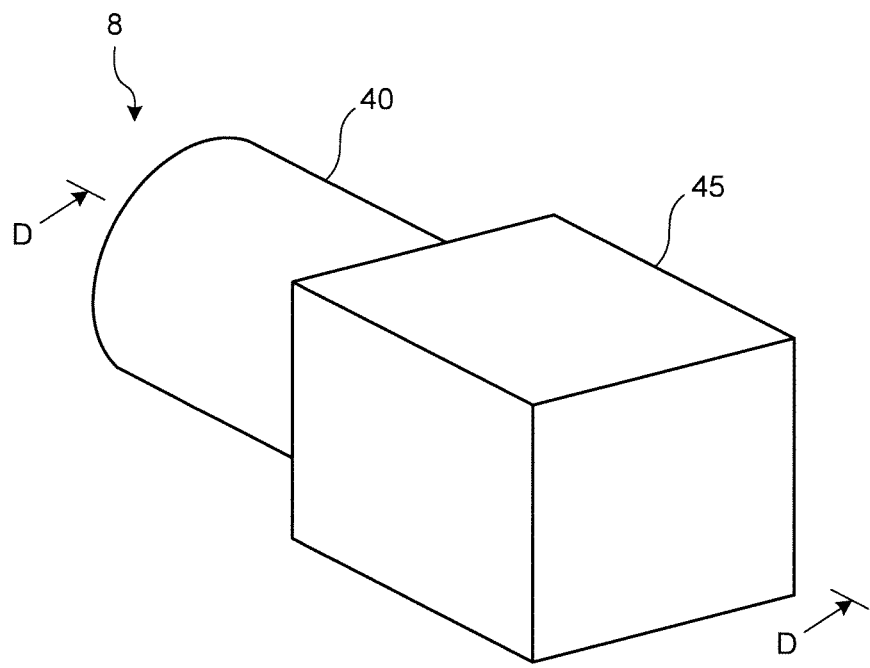
FIG. 6 is a detail view of the B portion of FIG. 2, which is a detail view of a hinge.
Figure 7:
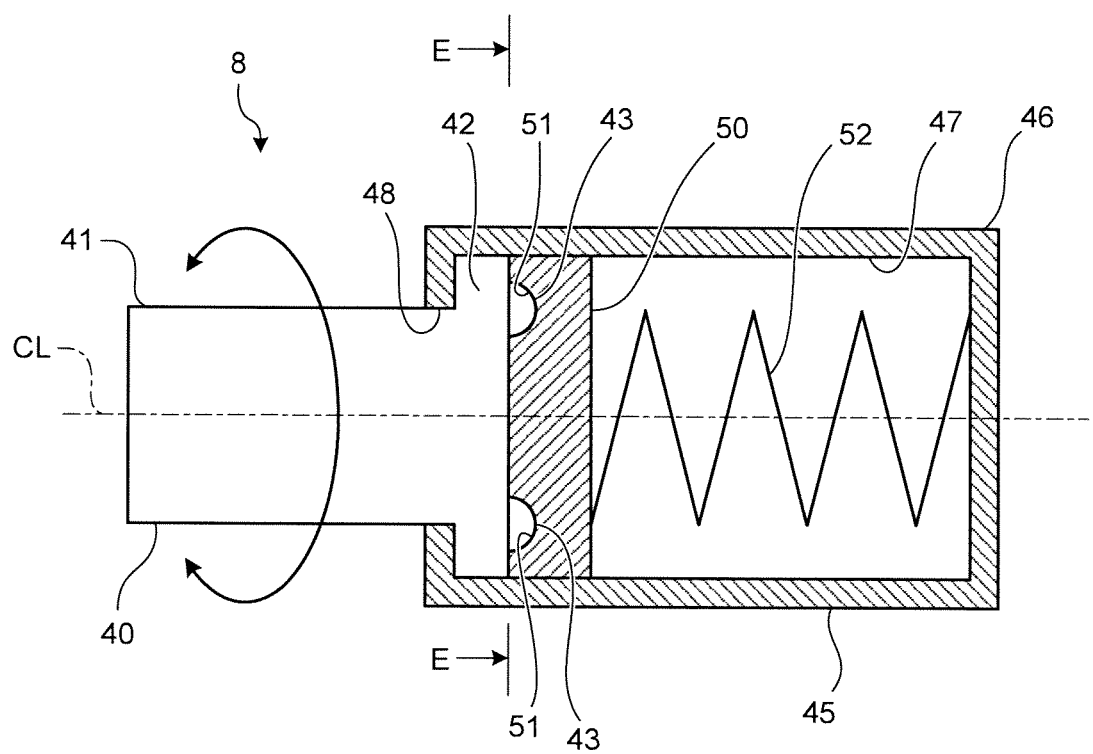
FIG. 7 is a D-D cross-sectional view of FIG. 6.

FIG. 6 is a detail view of the B portion of FIG. 2, which is a detail view of a hinge. FIG. 7 is a D-D cross-sectional view of FIG. 6. The cover unit 5 and the body unit 6 are connected to each other by the hinge(s) 8. The cover unit 5 and the body unit 6 are hinged at one side thereof, and the side is hinged at substantially both ends thereof. Each of the both ends is provided with the hinge 8, respectively, in the vicinity thereof. That is, the hinge 8 is disposed in each of two positions near both ends of the side. The hinges 8 provided in the two positions have the same configuration as each other.

More specifically, the hinge 8 includes a cover-unit side hinge portion 40 being a portion connected to the cover unit 5 and a body-unit side hinge portion 45 being a portion connected to the body unit 6. Of these portions, the cover-unit side hinge portion 40 is formed into a substantially cylindrical shape and is provided with a connecting portion 41 as a portion being connected to a region that causes the both units to open and close. Provided also in the cover-unit side hinge portion 40 is a contact portion 42 that is provided in one end of a cylinder being the shape of the connecting portion 41 in its axial direction. The contact portion 42 is formed into a substantially disc shape whose diameter is larger than that of the cylinder and whose center axis is coaxial to a center axis CL of the cylinder.

Figure 8:
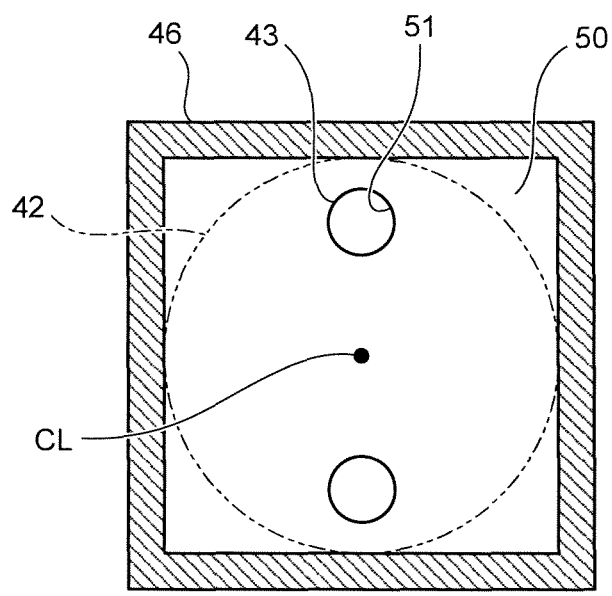
FIG. 8 is an E-E cross-sectional view of FIG. 7.

FIG. 8 is an E-E cross-sectional view of FIG. 7. A protrusion 43, which protrudes in a direction opposite to the side where the connecting portion 41 is positioned, is provided on the surface of the contact portion 42 opposite to the side where the connecting portion 41 is positioned. The contact portion 42 has two protrusions 43 which are provided at two different positions in the circumferential direction, respectively. The two different positions are positions near an outer circumferential side when the contact portion 42 is viewed in the axial direction. The two protrusions 43 are arranged at the positions which are point-symmetric around the center axis CL. In other words, the two protrusions 43 are arranged at the positions which are displaced by 180 degrees from each other around the center axis CL.

On the other hand, the body-unit side hinge portion 45 is formed into a substantially rectangular shape. When the body-unit side hinge portion 45 and the cover-unit side hinge portion 40 are assembled, the cover-unit side hinge portion 40 protrudes from one surface of the rectangular body-unit side hinge portion 45. The body-unit side hinge portion 45 includes a housing 46 with a space formed therein.

The housing 46 includes a space inside, and the space has a substantially square shape in such a manner that a length of one side thereof is slightly longer than the diameter of the disc being the shape of the contact portion 42 in the cover-unit side hinge portion 40, when viewed in a direction along the center axis CL of the cover-unit side hinge portion 40. The space of the housing 46 is a mechanism chamber 47 where members forming an open/close mechanism of the hinge 8 are internally disposed.

The housing 46 has a hole portion 48 being a hole through which the cover-unit side hinge portion 40 penetrates between the outside and the inside of the housing 46. The hole portion 48 has a diameter slightly larger than the diameter of the connecting portion 41. As for the cover-unit side hinge portion 40, the contact portion 42 is internally arranged in the mechanism chamber 47 of the housing 46, and the connecting portion 41 is disposed so as to penetrate the hole portion 48 of the housing 46 and protrude from the mechanism chamber 47 toward the outside of the housing 46.

Moreover, a energizing member 50 and a spring 52 are internally disposed in the mechanism chamber 47 of the housing 46. Of these two, the energizing member 50 is a board-like member having a substantially square shape slightly smaller than the square being the shape of the mechanism chamber 47, when viewed in the direction along the center axis CL of the cover-unit side hinge portion 40. The energizing member 50 is disposed so as to face the contact portion 42 positioned in the mechanism chamber 47. Therefore, the energizing member 50 is arranged so as to be movable in the direction along the center axis CL of the cover-unit side hinge portion 40 and to restrict rotation in a rotational direction around the center axis CL.

Recesses 51, which are recessed from the surface of the energizing member 50, are formed on a surface of the energizing member 50 at the contact portion 42 side thereof. Two recesses 51 are formed corresponding to the protrusions 43 formed on the contact portion 42 that faces the energizing member 50. The two recesses 51 are formed at positions corresponding to the protrusions 43 so as to have the size and the depth corresponding to these of the protrusions 43. Therefore, the two protrusions 43 can be engaged with the two recesses 51 respectively. Furthermore, even when the contact portion 42 is rotated 180 degrees around the center axis CL of the contact portion 42, the protrusions 43 and the recesses 51 change to another one of the protrusions 43 and the recesses 51, so that the other ones of the protrusions 43 and the recesses 51 can be engaged with each other.

The spring 52 is formed with a compression spring, and is disposed on the side opposite to the side where the contact portion 42 of the cover-unit side hinge portion 40 is positioned in the mechanism chamber 47, so that the spring 52 applies a spring force in a direction of pressing the energizing member 50 against the contact portion 42 to the energizing member 50. Therefore, the energizing member 50 is kept in a state of being always pressed against the contact portion 42 by the spring force of the spring 52.

In the hinge 8, the connecting portion 41 of the cover-unit side hinge portion 40 is connected to the cover unit 5 and the body-unit side hinge portion 45 is connected to the body unit 6. The cover-unit side hinge portion 40 is relatively rotatably disposed with respect to the body-unit side hinge portion 45 in the rotation direction around the center axis CL. Thus, the cover unit 5 and the body unit 6 are capable of opening and closing by relatively pivoting around the center axis CL of the cover-unit side hinge portion 40.

The hinge 8 is connected to the cover unit 5 and the body unit 6, so that the cover unit 5 and the body unit 6 can open and close by the hinge 8. However, the protrusions 43 and the recesses 51 provided in the hinge 8 have a positional relationship that the protrusions 43 and the recesses 51 engage with each other in a state where the cover unit 5 and the body unit 6 are closed, namely, in a state where the cover unit 5 and the body unit 6 overlap each other. In other words, in the hinge 8, when the cover unit 5 and the body unit 6 are closed, so that the first image reading unit 11 and the second image reading unit 12 face each other, and when the two image reading units 10 overlap each other, then the cover-unit side hinge portion 40 and the body-unit side hinge portion 45 are connected to the cover unit 5 and the body unit 6 respectively so that the protrusions 43 and the recesses 51 engage with each other.

Moreover, both the protrusions 43 and the recesses 51 are point-symmetrically formed. Even when the contact portion 42 and the energizing member 50 are relatively rotated 180 degrees around the center axis CL of the contact portion 42 from the state where the protrusions 43 and the recesses 51 engage with each other, the protrusions 43 and the recesses 51 are provided so that the protrusions 43 and the recesses 51 changes to the other protrusions 43 and recesses 51 to be engaged with each other, and thus, the other ones engage with each other. Therefore, the hinge 8, in which the protrusions 43 and the recesses 51 engage with each other respectively in the closed state between the cover unit 5 and the body unit 6, is disposed so that the protrusions 43 and the recesses 51 engage with each other even when the cover unit 5 and the body unit 6 are opened and the cover-unit side hinge portion 40 and the body-unit side hinge portion 45 are relatively rotated 180 degrees.

The hinge 8 has a rotation axis parallel to the respective surfaces of the two image reading units 10 that read images on the original. More specifically, in the hinge 8, when the cover unit 5 and the body unit 6 are closed, the center axis CL of the cover-unit side hinge portion 40 is formed in parallel to the respective surfaces, each of which faces the other image reading unit 10, in the two image reading units 10 being the first image reading unit 11 and the second image reading unit 12. Thus, the hinge 8 is provided so that the cover unit 5 and the body unit 6 can be relatively pivoted and be opened and closed around the rotation axis of the hinge 8 or around the center axis CL of the cover-unit side hinge portion 40.

Figure 9:
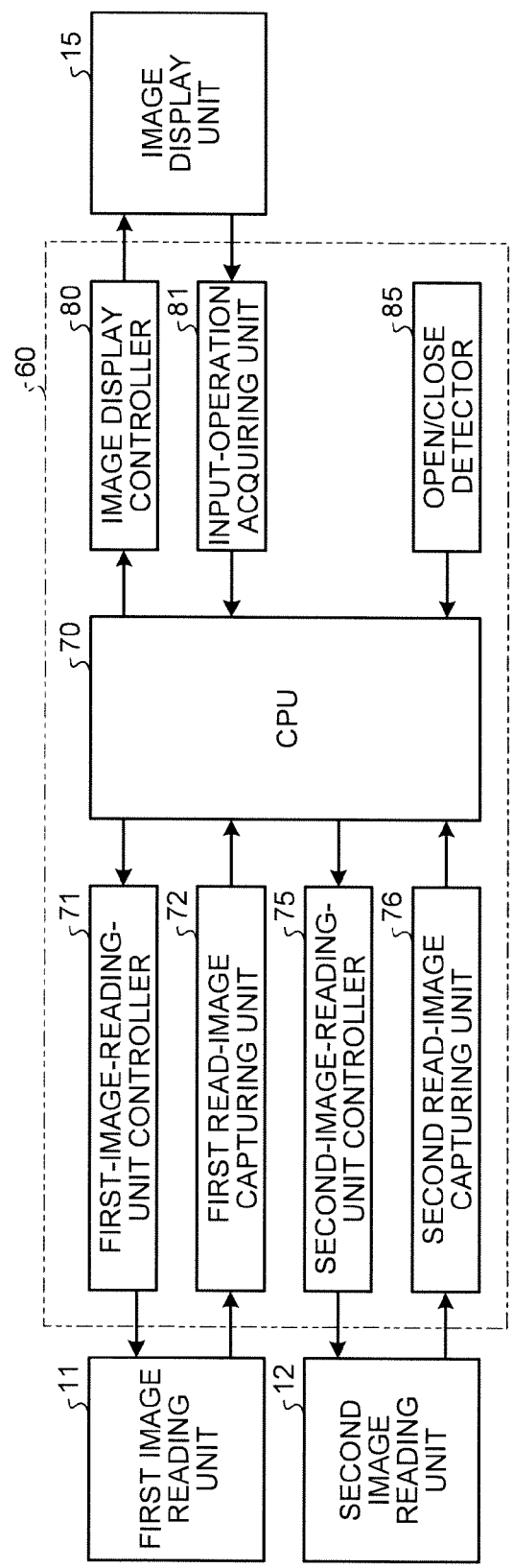
FIG. 9 is a schematic diagram of a configuration of the contact-type image reading apparatus shown in FIG. 1.

FIG. 9 is a schematic diagram of a configuration of the contact-type image reading apparatus shown in FIG. 1. The contact-type image reading apparatus 1 is provided so that various operations can be controlled by a main control board 60 in which a circuit for controlling the contact-type image reading apparatus 1 is incorporated or mounted. The main control board 60 is mounted on the body unit 6, and includes a processing unit, a storage unit, and an input-output unit. The processing unit among these units includes a CPU (Central Processing Unit) 70 that performs various computing processes.

The processing unit also includes a first-image-reading-unit controller 71 that controls the first image reading unit 11 so as to read an image, a first read-image capturing unit 72 that captures the image read by the first image reading unit 11, a second-image-reading-unit controller 75 that controls the second image reading unit 12 so as to read an image, a second read-image capturing unit 76 that captures the image read by the second image reading unit 12, an image display controller 80 that controls the image display unit 15 so as to display an image thereon, an input-operation acquiring unit 81 that acquires an input operation performed on the image display unit 15, and an open/close detector 85 that detects whether the cover unit 5 and the body unit 6 are opened or closed based on the result of detection performed by the open/close detection mechanism.

Figure 10:
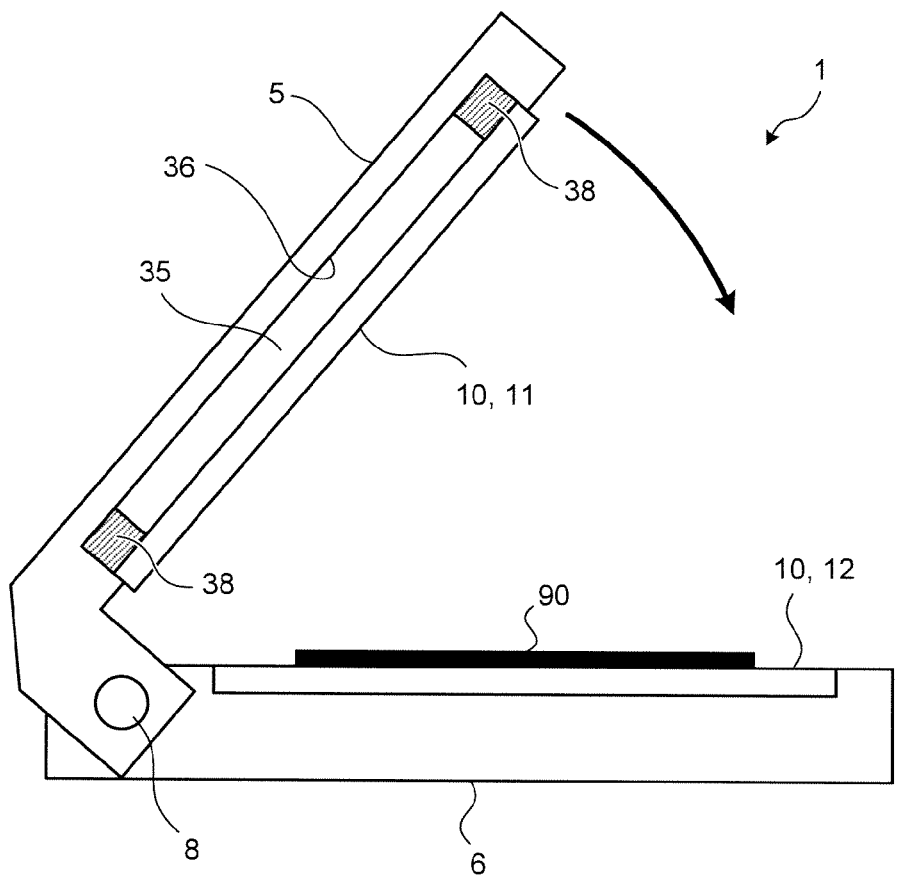
FIG. 10 is an explanatory diagram of how to set an original when an image on the original is to be read.

The contact-type image reading apparatus 1 according to the first embodiment is configured as described above, and the function thereof will be explained below. FIG. 10 is an explanatory diagram of how to set an original when reading an image on the original. The contact-type image reading apparatus 1 is used in such a manner that upon ordinary use, the body unit 6 is placed in the lower side in such an orientation that the second image reading unit 12 is directed upward, and that the cover unit 5 relatively openable and closable with respect to the second image reading unit 12 is used as a cover for the body unit 6. A case where an image of an original 90 is read by the contact-type image reading apparatus 1 will be explained below. First, in the open state of the cover unit 5, the original 90 is placed on the second image reading unit 12 provided in the body unit 6. When the original 90 is placed at the time of reading an image on the original 90, the original 90 is placed on the second image reading unit 12 in the open state of the cover unit 5 or in a state where a space is formed between the first image reading unit 11 and the second image reading unit 12.

Figure 11:
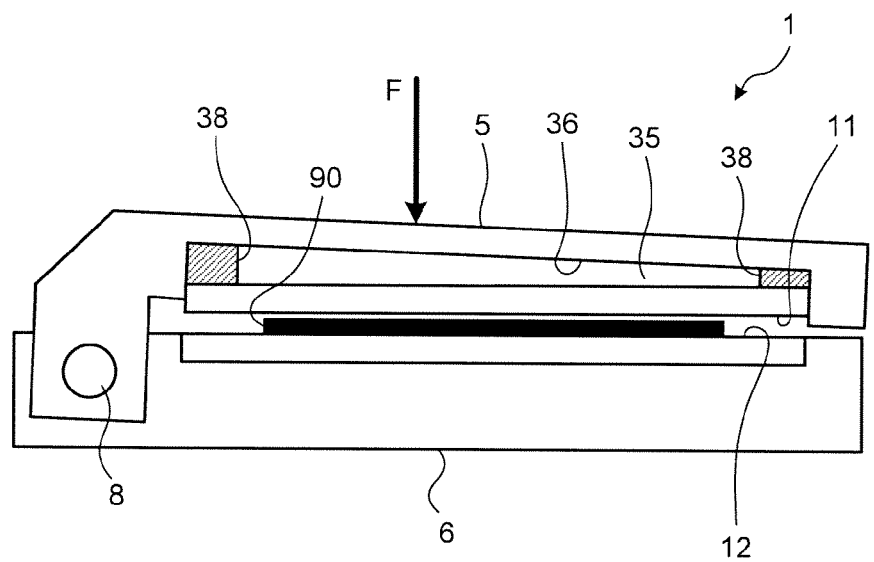
FIG. 11 is an explanatory diagram of a case where the image on the original is read.

FIG. 11 is an explanatory diagram of a case where the image on the original is read. The original 90 is set on the second image reading unit 12, and the cover unit 5 is closed in this state around the hinge 8 as a pivot center. Thus, the original 90 is sandwiched between the cover unit 5 and the body unit 6, and is in a state where it is sandwiched between the first image reading unit 11 and the second image reading unit 12. In other words, the image reading units 10 are positioned on both sides of the original 90.

Figure 12:
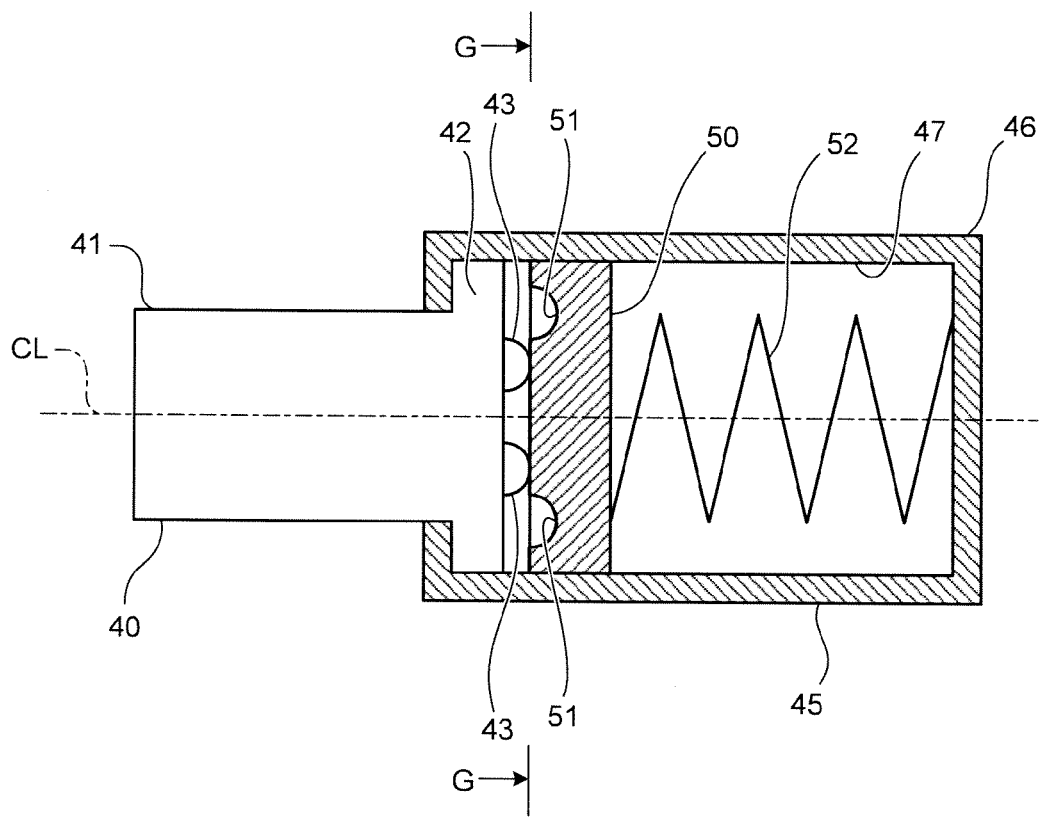
FIG. 12 is an explanatory diagram of an operation of the hinge.
Figure 13:
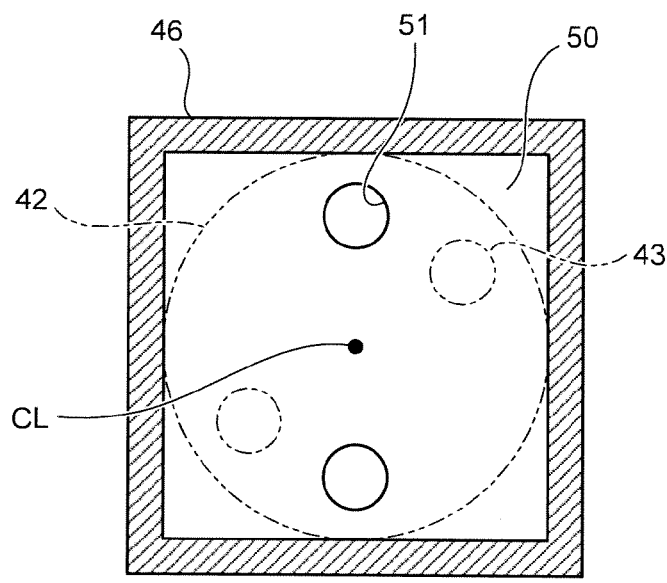
FIG. 13 is a G-G cross-sectional view of FIG. 12.

FIG. 12 is an explanatory diagram of an operation of the hinge 8. FIG. 13 is a G-G cross-sectional view of FIG. 12. The operation of the hinge 8 at the time of opening and closing the cover unit 5 and the body unit 6 around the hinge 8 as a pivot center will be explained below. Both the protrusions 43 of the cover-unit side hinge portion 40 and the recesses 51 of the body-unit side hinge portion 45 provided in the hinge 8 are point-symmetric, and the protrusions 43 and the recesses 51, which are both hemispheric, are formed so that both can be engaged with each other. The energizing member 50 where the recesses 51 are formed is provided movably within the mechanism chamber 47 of the body-unit side hinge portion 45 in the direction along the center axis CL of the cover-unit side hinge portion 40, and is pressed by the spring 52 internally provided in the mechanism chamber 47 in the direction of the contact portion 42 where the protrusions 43 are formed. Furthermore, when the cover unit 5 and the body unit 6 are closed, the protrusion 43 and the recess 51 are formed so as to be such a positional relationship that they engage with each other.

Therefore, when the cover unit 5 is opened around the hinge 8, the cover-unit side hinge portion 40 and the body-unit side hinge portion 45 are relatively pivoted around the center axis CL of the cover-unit side hinge portion 40 from the state where the protrusions 43 and the recesses 51 engage with each other according to a relative angle between the cover unit 5 and the body unit 6 (FIG. 12, FIG. 13). When the cover-unit side hinge portion 40 and the body-unit side hinge portion 45 are relatively pivoted as described, the protrusions 43 of the cover-unit side hinge portion 40 are removed from the state in which they engage with the recesses 51, and come into contact with any portions other than the recesses 51 in the energizing member 50. When the protrusions 43 are in contact with any portions other than the recesses 51 in the energizing member 50, the protrusions 43 push the energizing member 50 in the direction against the spring force of the spring 52 (FIG. 12).

As explained above, when the cover unit 5 is pivoted around the hinge 8 with respect to the body unit 6 in a state where the protrusions 43 are removed from the recesses 51, the relative positional relationship between the protrusions 43 and the recesses 51 also changes. However, when the relative relationship between the cover unit 5 and the body unit 6 is closer to the closed state, the protrusions 43 start to be engaged with the recesses 51.

The energizing member 50 is pushed in the direction of the contact portion 42 by the spring force of the spring 52 and is pressed against the protrusions 43. Therefore, when the protrusions 43 start to be engaged with the recesses 51, the force in the direction in which the protrusions 43 and the recesses 51 are further engaged with each other works on the contact portion 42 and the energizing member 50 by the spring force of the spring 52.

More specifically, when the protrusions 43 and the recesses 51 start to be engaged with each other, the positions of the protrusions 43 and the recesses 51 in the pivot direction or rotational direction around the center axis CL of the cover-unit side hinge portion 40 are displaced from each other. A component force in the pivot direction or rotational direction toward a position where the protrusions 43 and the recesses 51 engage works by the spring force of the spring 52 when the protrusions 43 and the recesses 51 start to engage, namely, when the protrusions 43 start to fit into the recesses 51. A rotating force in the pivot direction is generated between the cover-unit side hinge portion 40 and the body-unit side hinge portion 45 by the force generated by the engagement of the protrusions 43 and the recesses 51, and a force in the closing direction around the hinge 8 is generated between the cover unit 5 and the body unit 6. In other words, torque in the direction of closing the cover unit 5 and the body unit 6 is generated between the cover unit 5 and the body unit 6 when the opening/closing angle therebetween is a predetermined value or less. The predetermined value may be a fixed value or a constant value. Thus, when the cover unit 5 approaches the closed state at the time of closing the cover unit 5, the cover unit 5 is closed by the force caused by the spring force of the spring 52 in the hinge 8.

Figure 14:
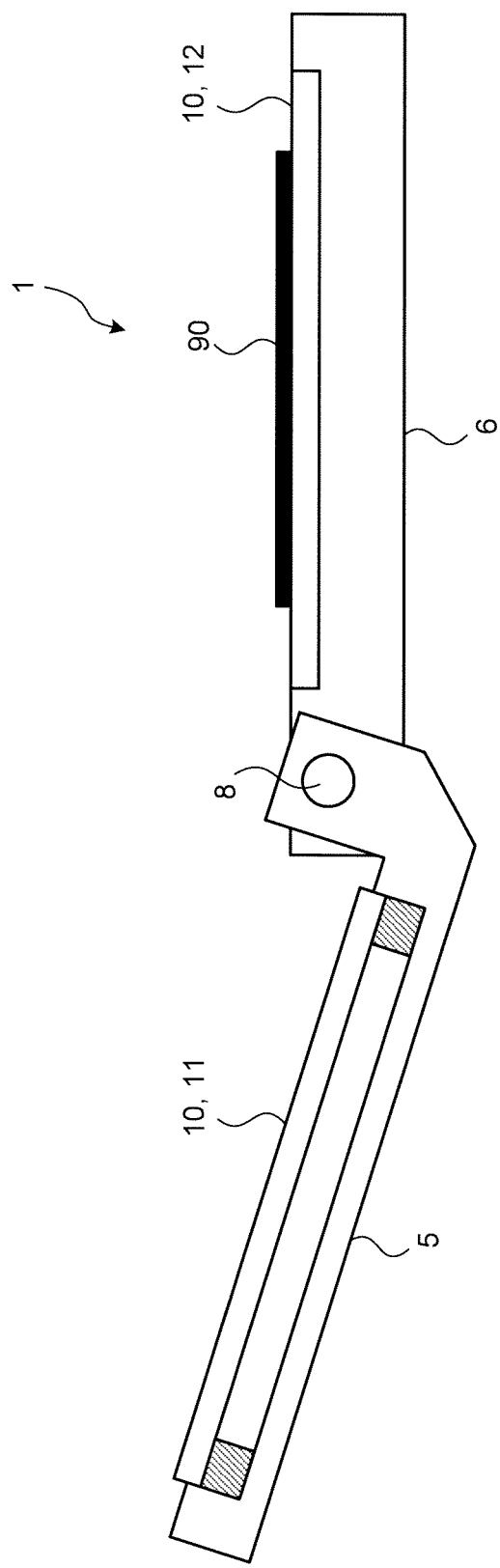
FIG. 14 is an explanatory diagram representing an open state of the cover unit.

FIG. 14 is an explanatory diagram representing an open state of the cover unit. The protrusions 43 and the recesses 51 are point-symmetric, and thus, the cover-unit side hinge portion 40 and the body-unit side hinge portion 45 are caused to relatively rotate so that they are rotated about 180 degrees from the state where the protrusions 43 and the recesses 51 were previously engaged with each other, and when the protrusions 43 and the recesses 51 start to be engaged with each other, the force caused by the spring force of the spring 52 in the hinge 8 also works on the cover unit 5 and the body unit 6. More specifically, by opening the cover unit 5 in the closed state, the cover unit 5 is opened in a state where the protrusions 43 are in contact with any portions other than the recesses 51 in the energizing member 50, and when the cover unit 5 is further opened about 180 degrees from its closed state, then the protrusions 43 and the recesses 51 are changed to the other protrusions 43 and recesses 51 than that in the closed state of the cover unit 5, and the other protrusions 43 and recesses 51 start to engage with each other.

As explained above, when the protrusions 43 and the recesses 51 start to be engaged with each other, similarly to the case of closing the cover unit 5, the force in the direction in which the cover unit 5 is opened 180 degrees around the hinge 8 from the closed state of the cover unit 5 is generated in the cover unit 5 and the body unit 6 by the force caused by the spring force of the spring 52 in the hinge 8. Thus, when the cover unit 5 approaches the open state at the time of opening the cover unit 5, the cover unit 5 is opened by the force caused by the spring force of the spring 52 in the hinge 8. In this way, the hinge 8 generates the torque in the opening/closing direction of the cover unit 5 and the body unit 6 by the protrusions 43 formed in the contact portion 42 of the cover-unit side hinge portion 40, the recesses 51 formed in the energizing member 50 of the body-unit side hinge portion 45, and the spring 52.

Figure 15:
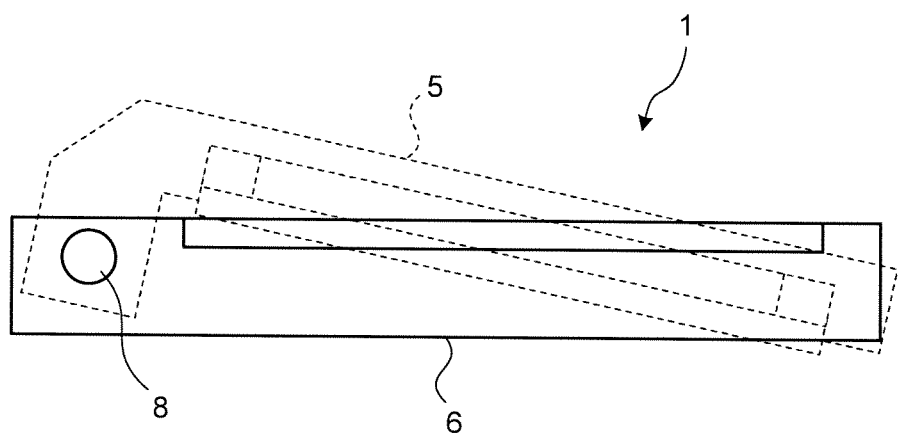
FIG. 15 is an explanatory diagram representing a relative relationship between the cover unit and a body unit in a fitting state between a protrusion and a recess in the hinge.

FIG. 15 is an explanatory diagram representing a relative relationship between the cover unit and the body unit in a engaged state of the protrusions and the recesses in the hinge. It should be noted that the hinge 8 generates the torque in the opening/closing direction between the cover unit 5 and the body unit 6 as described above, however, a relative angle, at which the protrusions 43 and the recesses 51 in the hinge 8 engage with each other when the cover unit 5 is closed, is preferably an angle where the cover unit 5 would break into the body unit 6. More specifically, when the cover unit 5 approaches the closed state, the torque in the direction in which the cover unit 5 is closed by the hinge 8 is generated between the cover unit 5 and the body unit 6. On the other hand, when the relative angle at which the protrusion 43 and the recess 51 engage with each other is set as an angle in the state where the cover unit 5 would break into the body unit 6, and when the cover unit 5 approaches the closed state, the cover unit 5 and the body unit 6 come in contact with each other before the protrusions 43 and the recesses 51 engage with each other, and thus, the cover unit 5 is not pivoted any further in the closing direction. Therefore, in this case, the cover unit 5 stops in a state where the protrusion 43 and the recess 51 are not totally engaged with each other, and the torque in the direction in which the cover unit 5 is pressed against the body unit 6 by the hinge 8 is continuously generated. The relative angle at which the protrusion 43 and the recess 51 in the hinge 8 engage with each other is preferably provided as an angle, when the cover unit 5 approaches the closed state in this manner, at which the torque in the direction in which the cover unit 5 is pressed against the body unit 6 is continuously generated.

The cover unit 5 and the body unit 6 can open and close around the hinge 8 as described above, however, when the cover unit 5 is closed when the original 90 is placed on the second image reading unit 12 and is sandwiched between the first image reading unit 11 and the second image reading unit 12, a pressing force against the original 90 is generated by the torque in the direction of closing the cover unit 5 by the spring force of the spring 52.

When the pressing force against the original 90 is generated, the original 90 and the image reading unit 10 come into contact with the each other at a large pressure. However, because the cushion materials 38 are arranged on the side opposite to the body unit 6 side in the first image reading unit 11, the first image reading unit 11 is mounted in the image-reading-unit mounting portion 35 through the cushion materials 38. The cushion materials 38 supporting the first image reading unit 11 by being arranged as described above have elasticity, and thus, the first image reading unit 11 is mounted in the image-reading-unit mounting portion 35 in a state where the first image reading unit 11 has elasticity in the depth direction of the image-reading-unit mounting portion 35 or in the thickness direction of the cushion materials 38.

Therefore, the first image reading unit 11 transmitted with the force in the direction of closing the cover unit 5 through the original 90 moves in a direction in which it lowers to the bottom portion 36 side of the image-reading-unit mounting portion 35 caused by the elastic deformation of the cushion materials 38 supporting the first image reading unit 11 according to the force. In this case, the movement of the first image reading unit 11 in its plane direction or in the direction along the surface for reading an image on the original 90 in the first image reading unit 11 is restricted by the wall surface of the image-reading-unit mounting portion 35. Therefore, the first image reading unit 11 moves only in the direction in which it lowers to the bottom portion 36 side of the image-reading-unit mounting portion 35.

As explained above, when the first image reading unit 11 lowers caused by the elastic deformation of the cushion materials 38, a force in the direction of the second image reading unit 12 provided in the body unit 6 is applied from the first image reading unit 11 to the original 90 by reaction force of the cushion materials 38 against the force in the direction in which the first image reading unit 11 lowers. Moreover, the force applied from the first image reading unit 11 to the original 90 in this manner is applied from the original 90 to the second image reading unit 12. More specifically, the force due to the elastic force of the cushion materials 38 is applied between the first image reading unit 11 and the original 90 and between the original 90 and the second image reading unit 12. In other words, the cushion materials 38 generate the pressing force between the original 90 and the two image reading units 10 when the cover unit 5 and the body unit 6 are closed and the original 90 is sandwiched between the cover unit 5 and the body unit 6.

In addition, when the cover unit 5 is to be closed, the pressing force against the original 90 is generated from the cover unit 5 and the body unit 6 by the torque based on the spring force of the spring 52 in the hinge 8. Therefore, the original 90 is applied with the force from both the first image reading unit 11 and the second image reading unit 12 due to the force in the direction of closing the cover unit 5 by the spring 52 of the hinge 8. This allows the original 90 to be pressed and spread even if the original 90 is bent or has some wrinkles and to become a state where the entire original 90 comes into close contact with both the first image reading unit 11 and the second image reading unit 12. Moreover, because the first image reading unit 11 is movable in the direction of lowering thereof caused by the elastic deformation of the cushion materials 38 in this manner, the first image reading unit 11 lowers according to the thickness of the original 90, and, at the same time, applies the force in the direction of the second image reading unit 12 to the original 90. Because of this, the original 90 comes into close contact with both the first image reading unit 11 and the second image reading unit 12. When the image on the original 90 is to be read by the image reading units 10, it is read in the state where the original 90 is in close contact with the first image reading unit 11 and the second image reading unit 12 in the above manner.

Here, there will be explained the pressing force against the original 90 when the original 90 is brought into close contact with the image reading units 10 using the cushion materials 38 and the spring force of the spring 52 in the hinge 8. When the original 90 is brought into close contact with the image reading units 10, the original 90 is preferably pressed by such a force that the original 90 can be made flat.

Therefore, in order to apply the pressing force to the original 90, features of the cushion material 38 and the hinge 8 are preferably set so as to satisfy a relationship of $(a/x)<k<\{(F-a)/x\}$, where "a"[N] is a force required to press the original 90 sandwiched between the cover unit 5 and the body unit 6 to make the original 90 flat, "k"[N/m] is a spring constant of the cushion material 38, "x"[m] is a maximum amount of deformation of the cushion material 38, and "F"[N] is a force applied to the cover unit 5 or to the body unit 6 in order that the cover unit 5 and the body unit 6 are in the closed state.

Among these, the force "a" required to make the original 90 flat is determined depending on characteristics of the original 90 to be read by the contact-type image reading apparatus 1 and is set as a magnitude of the force required to correct, if the original 90 is curled or bent, the curl or the like of the original 90 by applying the pressing force thereto and to make the original 90 flat.

The spring constant "k" of the cushion material 38 is a constant of an amount of displacement at the time of applying load thereto, similarly to a spring constant of general coil springs or the like. More specifically, the spring constant "k" is a proportional constant obtained by dividing the magnitude of the load by the amount of displacement in the thickness direction of the cushion material 38 when the load is applied to the thickness direction of the cushion material 38 (see FIG. 5) being the direction in which the cushion material 38 is squashed to be deformed at the time of applying the pressing force to the original 90.

The maximum amount "x" of deformation of the cushion material 38 is a maximum deformable amount in the thickness direction when the cushion material 38 is squashed and deformed in the thickness direction. The force "F" (see FIG. 11) applied to the cover unit 5 or the body unit 6 in order to close the cover unit 5 and the body unit 6 is, specifically, a pressing force in the direction of the body unit 6 by the spring force of the spring 52 when the cover unit 5 is closed by the spring force of the spring 52 in the hinge 8.

The spring constant of the spring 52 provided in the hinge 8, the shape of the hinge 8, and the features of the cushion material 38 are preferably set so that a relationship of these values satisfies a relationship of $F>(a+kx)$ and $a<kx$, or are preferably set so that it satisfies a relationship of $(a/x)<k<\{(F-a)/x\}$.

The image on the original 90 is read by the image reading unit 10 in a state where the original 90 is in close contact with the image reading unit 10. Next, the reading operation of the image by the image reading unit 10 will be explained below. When the image on the original 90 is to be read, the original 90 is set on the opposite side to the backlight 30 in the light-receiving/emitting layer 20 of the image reading unit 10, and the LEDs 33 provided in the backlight 30 of the image reading unit 10 are emitted in this state. The lights emitted by the LEDs 33 are guided to the entire light guide plate 31 by the light guide plate 31, and are reflected by the light reflector 32 at the portion where the light reflector 32 is located. Therefore, the lights emitted by the LEDs 33 are output from the surface of the backlight 30 on the opposite side to the side where the light reflector 32 is located, and irradiate the light-receiving/emitting layer 20. In other words, when the image is read, the light-receiving/emitting layer 20 is irradiated with the backlight 30 by emitting the LEDs 33.

When the light-receiving/emitting layer 20 is irradiated with the backlight 30, the light from the backlight 30 transmits the glass substrate 21 provided in the light-receiving/emitting layer 20, and is output toward the original 90 through the light-emitting portions 26 being the portions, where the light-receiving elements 25 are not arranged, on the surface in the opposite side to the side where the backlight 30 is located in the glass substrate 21. In other words, when the backlight 30 is lighted, the light is irradiated to the original 90 through the light-emitting portions 26.

In this way, the light output from the light-emitting portions 26 and reaching the original 90 is reflected by the original 90. At this time, the light is reflected as a reflected light according to the state of the surface of the original 90 such as color of the surface. The light reflected by the original 90 is reflected toward the direction of the light-receiving/emitting layer 20, and travels toward the light-receiving/emitting layer 20. The reflected light traveling toward the light-receiving/emitting layer 20 reaches the light-receiving/emitting layer 20 from the surface of the light-receiving/emitting layer 20 on the side where the light-receiving elements 25 and the light-emitting portions 26 are positioned. Thus, the light-receiving elements 25 receive the reflected light reflected by the original 90.

The reflected light reflected by the original 90 becomes a reflected light according to the state of the surface of the original 90, and the light-receiving elements 25 are provided so that an electrical signal can be generated according to the received light. Therefore, the light-receiving elements 25 that receive the reflected light reflected by the original 90 generate electrical signals according to the state of the surface of the original 90 by which the received reflected light is reflected. At this time, because the light-receiving elements 25 are two-dimensionally arranged, the light-receiving elements 25 receive reflected light reflected by the original 90 at each position in the two-dimensional direction of the original 90, and generate electrical signals according to the state of the surface of the original 90. The electrical signals generated by the light-receiving elements 25 in this manner are transmitted to the main control board 60, and the main control board 60 acquires the electrical signals, thereby acquiring image information for the original 90 on its side that the image reading unit 10 faces. Thus, the image on the original 90 is two-dimensionally read. More specifically, the image on the original 90 on the side facing the image reading unit 10 is read by the image reading unit 10.

In this way, the image on the original 90 is read in the closed state between the cover unit 5 and the body unit 6, the cover unit 5 and the body unit 6 are opened again, and the original 90 set on the second image reading unit 12 is taken out.

Next, a control procedure at the time of reading the image on the original 90 by the image reading unit 10 will be explained. When the cover unit 5 and the body unit 6 are closed in a state where the original 90 is set on the second image reading unit 12 at the time of reading the image on the original 90, the open/close detector 85 detects that the both units are in the closed state. In this manner, when the closed state between the cover unit 5 and the body unit 6 is detected by the open/close detector 85, the contact-type image reading apparatus 1 performs reading control on images of the original 90 by the image reading units 10 automatically or through a predetermined input operation to the image display unit 15. When the image reading control is performed, the first-image-reading-unit controller 71 controls the first image reading unit 11 and the second-image-reading-unit controller 75 controls the second image reading unit 12. Thus, the image reading units 10 start reading images.

The first image reading unit 11 or the second image reading unit 12 reads an image on the original 90, the first read-image capturing unit 72 or the second read-image capturing unit 76 captures the image, and the image display controller 80 controls the image display unit 15 to display the image thereon. The user of the contact-type image reading apparatus 1 visually recognizes the image on the original 90 displayed on the image display unit 15, and when the user performs an input operation to a start button being one of the functions of the image display unit 15 at an arbitrary timing, the contact-type image reading apparatus 1 stores the image captured by the first read-image capturing unit 72 or the second read-image capturing unit 76 in the storage unit. In other words, the images read by the first image reading unit 11 and the second image reading unit 12 are stored in the storage unit, thereby imaging the images of the original 90.

The contact-type image reading apparatus 1 as explained above is configured that the cover unit 5 and the body unit 6 are provided so as to be openable and closable, the first image reading unit 11 is provided in the cover unit 5, and the second image reading unit 12 is provided in the body unit 6. The first image reading unit 11 and the second image reading unit 12 are disposed at positions where the both units face each other when the cover unit 5 and the body unit 6 are closed. In this way, when the cover unit 5 and the body unit 6 are closed to sandwich the original 90 therebetween, the original 90 is sandwiched between the two image reading units 10, so that the image reading units 10 can be positioned on both sides of the original 90. Therefore, the images on both sides of the original 90 can be almost simultaneously read by the two image reading units 10. When images of the original 90 are read by the first image reading unit 11 and the second image reading unit 12, one image is read by one of the image reading units 10, and then the other image is read by the other image reading unit 10, and thus, these operations are continuously performed in a short time although not strictly simultaneous. Therefore, by providing the image reading units 10 in the cover unit 5 and the body unit 6, the both sides of the original 90 can be read almost simultaneously. As a result, the both sides of the original 90 can be read more easily.

The first image reading unit 11 is mounted on the cover unit 5 through the cushion materials 38 being an elastic member, and when the original 90 is placed between the cover unit 5 and the body unit 6, the pressing force is generated between the original 90 and the two image reading units 10 caused by the elastic force of the cushion materials 38. This allows the images of the original 90 to be read in a state where the original 90 is in close contact with the image reading units 10. As a result, the original 90 can be more clearly read.

Moreover, by mounting the first image reading unit 11 on the cover unit 5 through the cushion materials 38, variations in the flatness of mounting the two image reading units 10 and a difference in thickness of each original 90 can be absorbed by the elastic deformation of the cushion materials 38. This allows the images of the original 90 to be more surely read in the state where the original is in close contact 90 with the image reading units 10. As a result, the original 90 can be more clearly read.

The relative relationship of the numerical values is defined in order to generate the force required to press the original 90 and make the original 90 flat, and thus the original 90 can be more reliably brought into contact with the image reading units 10. In other words, the numerical values: the force "a" required to make the original 90 flat, the spring constant "k" of the cushion material 38, the maximum amount "x" of deformation of the cushion material 38, and the force "F" applied to the cover unit 5 or to the body unit 6 in order that the cover unit 5 and the body unit 6 are in the closed state are set so as to satisfy the relationship of $(a/x) < k < \{(F-a)/x\}$. This allows the original 90 to be more reliably made flat and to be in close contact with the image reading units 10 even when the original 90 is bent or wrinkled at the time of reading the original 90 in the pressed state of the original 90. As a result, the original 90 can be more surely and clearly read.

The cover unit 5 and the body unit 6 are provided so as to be connected to each other by the hinges 8 and be relatively openable and closable. Therefore, when the image on the original 90 is to be read, the cover unit 5 and the body unit 6 can be easily opened by relatively pivoting the cover unit 5 and the body unit 6 around the hinges 8, so that the original 90 can be positioned between the opened cover unit 5 and the body unit 6. Likewise, when the original 90 positioned between the cover unit 5 and the body unit 6 is to be sandwiched therebetween, the cover unit 5 and the body unit 6 can be also easily closed by relatively pivoting the cover unit 5 and the body unit 6 around the hinges 8, so that the original 90 can be sandwiched between the cover unit 5 and the body unit 6. This allows the original 90 to be more easily sandwiched between the first image reading unit 11 and the second image reading unit 12, and the image reading units 10 to be positioned on the both sides of the original 90. As a result, the easiness at the time of reading the both sides of the original 90 can be more reliably improved.

For the hinge 8, the center axis CL of the cover-unit side hinge portion 40 is formed parallel to the surfaces for reading the images of the original 90 in the image reading units 10. Thus, the hinge 8 is provided so that the rotation axis upon opening and closing of the cover unit 5 and the body unit 6 is directed parallel to the surfaces for reading the images of the original 90 in the two image reading units 10. Therefore, the opening/closing direction upon opening/closing of the cover unit 5 and the body unit 6 around the hinge 8 can be conformed to a direction in which the distance between the surfaces for reading the images of the original 90 in the first image reading unit 11 and the second image reading unit 12 can be changed.

In this way, when the original 90 is positioned between the cover unit 5 and the body unit 6 and the original 90 is placed on the second image reading unit 12, by opening the cover unit 5 and the body unit 6 around the hinges 8, the distance between the surfaces for reading the images of the original 90 in the first image reading unit 11 and the second image reading unit 12 can be made large. Thus, the original 90 can be easily positioned between the cover unit 5 and the body unit 6. Moreover, when the original 90 is to be sandwiched between the cover unit 5 and the body unit 6, by closing the cover unit 5 and the body unit 6 around the hinges 8, the distance between the surfaces for reading the images of the original 90 in the first image reading unit 11 and the second image reading unit 12 can be made small. Thus, the original 90 can be easily sandwiched between the cover unit 5 and the body unit 6. Therefore, the original 90 can be more easily sandwiched between the first image reading unit 11 and the second image reading unit 12, and the image reading units 10 can be positioned on the both sides of the original 90. As a result, the easiness at the time of reading the both sides of the original 90 can be more reliably improved.

In addition, when the relative opening/closing angle between the cover unit 5 and the body unit 6 is a predetermined value or less, the both units are provided so that the torque in the direction of closing the both units is generated by the spring force of the spring 52 in the hinge 8 and by the functions of the protrusions 43 in the cover-unit side hinge portion 40 and of the recesses 51 in the energizing member 50. This allows the pressing force to be more reliably generated between the original 90 and the two image reading units 10 at the time of sandwiching the original 90 between the cover unit 5 and the body unit 6. Therefore, the images of the original 90 can be more surely read in the state where the original 90 is in close contact with the image reading units 10. As a result, the original 90 can be more clearly read.

Second Embodiment

Figure 16:
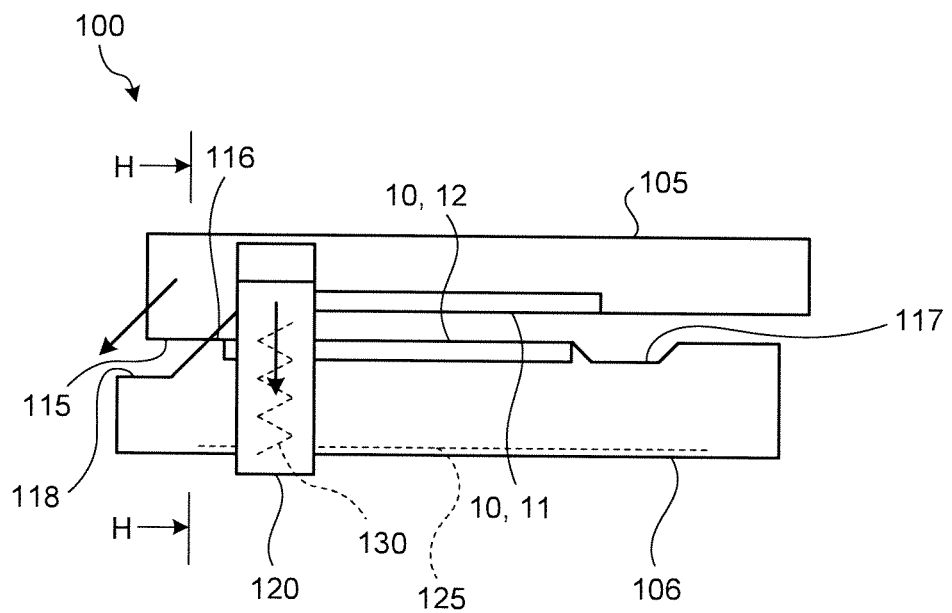
FIG. 16 is an explanatory diagram of a contact-type image reading apparatus according to a second embodiment.
Figure 17:
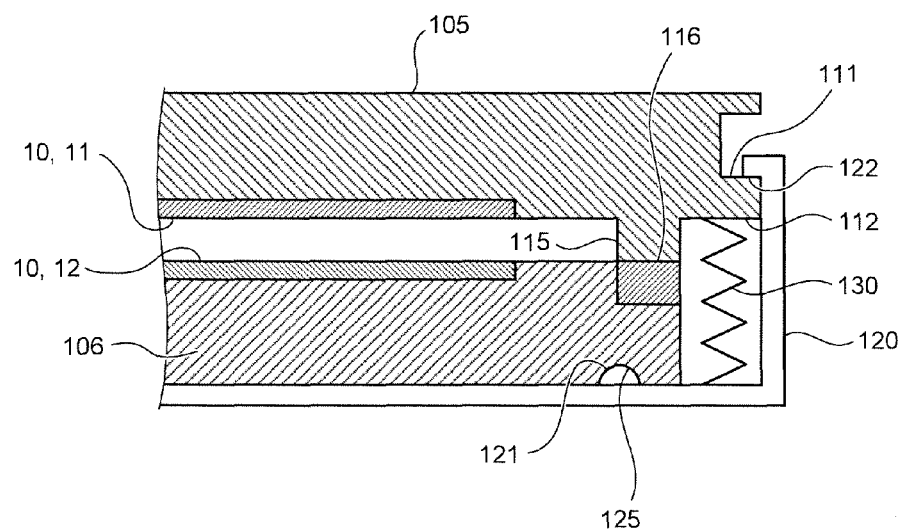
FIG. 17 is an H-H cross-sectional view of FIG. 16.

A contact-type image reading apparatus 100 according to a second embodiment has substantially the same configuration as that of the contact-type image reading apparatus 1 according to the first embodiment, however, it is characterized in that a cover unit and a body unit are opened and closed by a slide construction. The rest of the components are the same as these of the first embodiment, and thus explanation thereof is omitted and the same numerals are assigned to the same components. FIG. 16 is an explanatory diagram of the contact-type image reading apparatus according to the second embodiment. FIG. 17 is an H-H cross-sectional view of FIG. 16. Similarly to the contact-type image reading apparatus 1 according to the first embodiment, the contact-type image reading apparatus 100 according to the second embodiment includes the image display unit 15 (see FIG. 1) where an arbitrary image can be displayed, and the image reading units 10 that read images of an original. The image reading units 10 include the first image reading unit 11 and the second image reading unit 12. Of the units, the first image reading unit 11 is provided in a cover unit 105 being the first body unit, and the second image reading unit 12 is provided in a body unit 106 being the second body unit. These cover unit 105 and body unit 106 are arranged in an orientation in which the first image reading unit 11 and the second image reading unit 12 face each other, and are connected to each other by a slide guide 120 engaged with the cover unit 105.

More specifically, the cover unit 105 and the body unit 106 are provided relatively movably or slidably in a predetermined direction along reading surfaces of the image reading units 10. A cover-unit side engaging unit 111 that can be engaged with the slide guide 120 is provided at both ends of the cover unit 105 in its width direction with respect to a slide direction. In other words, the cover-unit side engaging unit 111 provided in the cover unit 105 is arranged at the both ends of the cover unit 105 in the direction orthogonal to the slide direction in a parallel direction to the reading surface of the first image reading unit 11.

A slide portion 115 protruding in the direction of the body unit 106 is provided in the surface of the cover unit 105 facing the body unit 106 or in the surface of the cover unit 105 on the side where the first image reading unit 11 is provided. The slide portion 115, similarly to the cover-unit side engaging unit 111, is disposed near the both ends in the width direction with respect to the slide direction, but is provided more inside in the width direction with respect to the slide direction than the cover-unit side engaging unit 111. Furthermore, the slide portion 115 is disposed at one end side of the cover unit 105 in the slide direction between the cover unit 105 and the body unit 106. More specifically, the slide portion 115 is formed at an end portion of the cover unit 105 closer to the body unit 106 when it is slid in a direction of separating the cover unit 105 and the body unit 106 or in a direction of reducing a portion where the both units are overlapped.

On the other hand, a support face 116 in contact with the slide portion 115 of the cover unit 105 is formed in the body unit 106 on the surface that faces the cover unit 105 or on the surface of the side where the second image reading unit 12 is provided. The support face 116 is formed along the slide direction at a position in the width direction with respect to the slide direction between the cover unit 105 and the body unit 106, the position being the same position as the position where the slide portion 115 provided in the cover unit 105 is disposed.

The support face 116 provided in this manner includes an open engaging portion 117 which is recessed with respect to the other portions on the support face 116. More specifically, the open engaging portion 117 is formed on the support face 116 so as to have a difference in level with respect to the other portions, and the support face 116 including the open engaging portion 117 is structured so that a portion adjacent to the open engaging portion 117 and a flat portion in the open engaging portion 117 are connected to each other by a gentle slope. Moreover, the open engaging portion 117 provided in the support face 116 is formed, when the cover unit 105 and the body unit 106 are relatively slid in a direction in which the cover unit 105 and the body unit 106 are separated, at a portion near an end closer to the cover unit 105 in the support face 116.

In the body unit 106, a relief portion 118 is formed at an end on the opposite side to the end on the side where the open engaging portion 117 of the support face 116 is positioned. The relief portion 118 is recessed with respect to the support face 116. More specifically, the relief portion 118 is formed so as to be recessed with respect to the support face 116 in such a manner that a difference in level with respect to the support face 116 is higher than the height in a protruding direction of the slide portion 115 that is protruded from the cover unit 105. In addition, a gentle slope is formed between the support face 116 and the relief portion 118, and the support face 116 having the difference in level and the relief portion 118 are connected to each other by the slope. The cover unit 105 and the body unit 106 provided in the above manner are provided in an overlapping manner in a state where the slide portion 115 of the cover unit 105 is in contact with the support face 116 of the body unit 106.

The slide guide 120 is connected to the cover unit 105 in such a manner that a guide-side engaging portion 122 provided in the slide guide 120 is engaged with the cover-unit side engaging unit 111 of the cover unit 105 that overlaps the body unit 6. More specifically, the cover-unit side engaging unit 111 is formed at both ends of the cover unit 105 in the width direction with respect to the slide direction by protruding outwardly in the width direction with respect to the slide direction.

On the other hand, the slide guide 120 is formed in such a manner that a narrow rectangular plate or a strip-shaped plate is bent, in a state where the cover unit 105 and the body unit 106 are overlapped, from one of the cover-unit side engaging units 111 located at the both ends of the cover unit 105 to the other cover-unit side engaging unit 111 along the surface on the opposite side to the cover unit 105 side in the body unit 106.

In the slide guide 120 formed in this manner, a protrusion 121 protruding toward the body unit 6 is formed at a portion on the body unit 106 side, or at a portion in the slide guide 120 passing through the surface on the opposite side to the cover unit 105 side of the body unit 106. In the body unit 106, there is formed a guide groove 125 being a groove formed along the slide direction at the position where the protrusion 121 of the slide guide 120 is provided in the width direction with respect to the slide direction. The protrusion 121 and the guide groove 125 formed in this manner are in a state where the protrusion 121 is set in the guide groove 125 when the cover unit 105 and the body unit 106 are overlapped and the cover unit 105 and the slide guide 120 are engaged with each other. The guide-side engaging portion 122 provided in the slide guide 120 comes into contact with and is engaged with the surface of the cover-unit side engaging unit 111 on the opposite side to the side where the body unit 106 is located.

In this way, when the cover unit 105 moves in the direction away from the body unit 106, the movement of the cover-unit side engaging unit 111 in the direction away from the body unit 106 is restricted by the guide-side engaging portion 122, and the movement of the cover unit 105 is restricted when the cover unit 105 moves in the direction away from the body unit 106. Likewise, when the body unit 106 moves in the direction away from the cover unit 105, the slide guide 120 moves together with the body unit 106 in the direction away from the cover unit 105, and the movement of the guide-side engaging portion 122 in the direction away from the cover unit 105 is restricted by the cover-unit side engaging unit 111, so that the movement of the body unit 106 and the slide guide 120 is restricted when the body unit 106 and the slide guide 120 move in the direction away from the cover unit 105.

A spring 130 is disposed between an area near a portion where the cover-unit side engaging unit 111 in the cover unit 105 is positioned and the slide guide 120. The spring 130 is formed with a tension spring, and is provided between a surface, formed in such a manner that it is extended from the surface where the protrusion 121 is formed to be continuously formed, and a spring-force receiving unit 112 being a surface on the body unit 106 side of the cover unit 105 near the portion where the cover-unit side engaging unit 111 is positioned. The spring 130 is disposed in this position and is connected to the spring-force receiving unit 112 and the slide guide 120.

The spring 130 applies the spring force in a direction in which the spring-force receiving unit 112 and the slide guide 120 approach each other by applying tension force thereto, i.e., the spring-force receiving unit 112 is applied with the spring force in the direction in which the cover unit 105 approaches the body unit 106. Thus, the cover unit 105 and the slide guide 120 are applied with the force in the direction in which the both units approach each other. Moreover, because the cover unit 105 in the slide guide 120 is provided with the body unit 106, the force in the direction towards the cover unit 105 applied to the slide guide 120 is transmitted to the body unit 106. In other words, therefore, the cover unit 105 and the body unit 106 are applied with the force in the direction in which the both units approach each other by the tension force of the spring 130.

The cover unit 105 and the body unit 106 are applied with the force in the direction in which the both units approach each other by the tension force of the spring 130. The slide portion 115 protruding in the direction of the body unit 106 is provided on the surface of the body unit 106 side in the cover unit 105. Moreover, in the width direction with respect to the slide direction of the cover unit 105 and the body unit 106, the support face 116 which contacts the slide portion 115 is formed on the body unit 106 at the same position as the position of the slide portion 115 of the cover unit 105. Because of this, when the cover unit 105 and the body unit 106 are applied with the force in the direction in which the both units approach each other by the tension force of the spring 130, the slide portion 115 and the support face 116 become a state where they are mutually pressed against each other. As explained above, the state where the cover unit 105 and the body unit 106 are overlapped is maintained by the slide guide 120 and the spring 130.

The contact-type image reading apparatus 100 according to the second embodiment is configured as described above, and the function thereof will be explained below. In the contact-type image reading apparatus 100 according to the second embodiment, the cover unit 105 and the body unit 106 are provided so as to be openable and closable. In the contact-type image reading apparatus 100 according to the second embodiment, the cover unit 105 and the body unit 106 are opened and closed through relative sliding unlike the contact-type image reading apparatus 1 according to the first embodiment in which the cover unit 5 and the body unit 6 are opened and closed by the hinges 8. More specifically, in the contact-type image reading apparatus 100 according to the second embodiment, the cover unit 105 and the body unit 106 are opened and closed by performing a relative linear motion in parallel to the respective surfaces for reading images of the original (see FIG. 10, FIG. 11, and FIG. 14) in the two image reading units 10.

Figure 18:
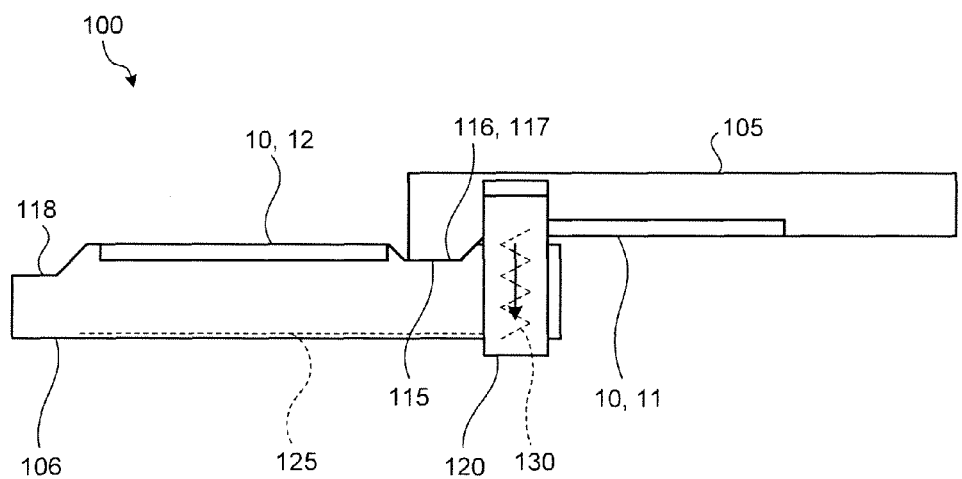
FIG. 18 is an explanatory diagram representing an open state of the cover unit.

FIG. 18 is an explanatory diagram representing an open state of the cover unit. When the cover unit 105 is to be opened through the linear motion, specifically, the cover unit 105 is relatively slid with respect to the body unit 6 along a direction where the support face 116 of the body unit 106 is formed. When the cover unit 105 and the body unit 106 are relatively slid as described above, because the guide-side engaging portion 122 is engaged with the cover-unit side engaging unit 111 in the cover unit 105, the position of the slide guide 120 in the slide direction is the same position as that of the cover-unit side engaging unit 111 of the cover unit 105, and the slide guide 120 also moves relatively with respect to the body unit 106. At this time, the protrusion 121 formed in the slide guide 120 relatively moves along the guide groove 125 in the state where the protrusion 121 formed in the slide guide 120 is set in the guide groove 125 of the body unit 106.

The cover unit 105 and the body unit 106 are applied with the force in the direction in which the both units approach each other by the tension force of the spring 130, and the slide portion 115 of the cover unit 105 is pressed against the support face 116 of the body unit 106. Therefore, when opening the cover unit 105 by sliding, the cover unit 105 is slid in a state where the slide portion 115 is in contact with the support face 116 or in a state where the slide portion 115 and the support face 116 are separated from each other by applying the force to the cover unit 105 and the body unit 106 in the direction of separating the both units from each other. The direction of sliding the cover unit 105 at the time of opening the cover unit 105 in this way is the direction in which the slide portion 115 is slid to approach the open engaging portion 117 of the support face 116 while sliding the slide portion 115 along the support face 116 of the body unit 106.

In a state where the cover unit 105 is slid in this direction and the slide portion 115 reaches the open engaging portion 117 of the support face 116, the force in the direction of sliding the cover unit 105 and the force in the direction of separating the cover unit 105 and the body unit 106 from each other are removed. Because the cover unit 105 and the body unit 106 are applied with the force in the direction in which the both units approach each other by the tension force of the spring 130, if the force to be applied at the time of opening the cover unit 105 is removed in this manner, the slide portion 115 is pressed against the open engaging portion 117.

When slide portion 115 makes the cover unit 105 slide up to the portion where the open engaging portion 117 is positioned, the slide portion 115 is pressed against the open engaging portion 117. The open engaging portion 117 is recessed with respect to the other portions on the support face 116. Therefore, in the state where the slide portion 115 is pressed against the open engaging portion 117, when the slide portion 115 is moved along the support face 116, the cover unit 105 needs to be slid while the cover unit 105 is moved in the direction in which it is separated from the body unit 106, overcoming the force in the direction in which the slide portion 115 is pressed against the support face 116 by the spring 130.

In other words, therefore, when the cover unit 105 is slid with respect to the body unit 106 until the slide portion 115 is positioned at the portion where the open engaging portion 117 is formed, the slide portion 115 is engaged in the open engaging portion 117, and the movement of the slide portion 115 that moves along the support face 116 is restricted by the open engaging portion 117, thereby restricting the sliding between the cover unit 105 and the body unit 106.

In this way, when the slide portion 115 is engaged in the open engaging portion 117, the sliding between the cover unit 105 and the body unit 106 is restricted. In this case, the slide portion 115 is disposed at one end of the cover unit 105 in the slide direction between the cover unit 105 and the body unit 106. Besides, the open engaging portion 117 is formed at a portion near the end closer to the cover unit 105 of the support face 116 when the cover unit 105 and the body unit 106 are relatively slid in the direction of separating the both units from each other. Therefore, the positional relationship between the cover unit 105 and the body unit 106 when the slide portion 115 is engaged in the open engaging portion 117 becomes a state where the end portions of both the cover unit 105 and the body unit 106 are engaged with each other, and most of the portions of the cover unit 105 and the body unit 106 are not overlapped with the other portions, thus becoming a displaced state.

Therefore, when the slide portion 115 engages the open engaging portion 117, the first image reading unit 11 provided in the cover unit 105 and the second image reading unit 12 provided in the body unit 106 do not mutually face each other, and accordingly the first image reading unit 11 and the second image reading unit 12 are in an open state. Thus, the cover unit 105 and the body unit 106 are relatively opened, or the cover unit 105 becomes an open state. When the image on the original 90 (see FIG. 10, FIG. 11, and FIG. 14) is to be read, the original 90 is set on the second image reading unit 12 in the open state of the cover unit 105.

When the cover unit 105 is opened, the cover unit 105 is slid so that the slide portion 115 is moved up to the portion where the open engaging portion 117 is provided. The portion adjacent to the open engaging portion 117 of the support face 116 and the flat portion of the open engaging portion 117 are connected to each other with the gentle slope. Therefore, when the slide portion 115 reaches the slope portion by sliding the cover unit 105, the slide portion 115 is moved by the tension force of the spring 130 in the direction of the open engaging portion 117 along the slope portion, and the cover unit 105 and the body unit 106 are thereby opened. More specifically, the cover unit 105 and the body unit 106 are configured so as to generate the force in the direction of opening the both units when the relative positional relationship therebetween in the opening/closing direction is the open state or when a moving amount is a predetermined value or less based on the engagement between the slide portion 115 and the open engaging portion 117. The predetermined value may be a fixed value or a constant value.

The cover unit 105 is slid to open the cover unit 105. After the original 90 is set on the second image reading unit 12, the cover unit 105 is slid, with the original being set on the second image reading unit 12, in the direction of closing the cover unit 105. That is, the cover unit 105 is slid in the direction in which the slide portion 115 of the cover unit 105 engaged in the open engaging portion 117 is directed toward the relief portion 118 positioned in the end of the opposite side to the end on the open engaging portion 117 side in the support face 116.

In this case, the slide portion 115 engaged in the open engaging portion 117 that is recessed with respect to the other portions in the support face 116 needs to be separated from the open engaging portion 117. Therefore, the force in the direction of separating the cover unit 105 from the body unit 106 with the magnitude of the tension force or more of the spring 130 is applied to the cover unit 105, so that the cover unit 105 is separated from the body unit 106, and the slide portion 115 is caused to come into contact with the portion other than the open engaging portion 117 in the support face 116. When the cover unit 105 in the open state is to be closed, the cover unit 105 is slid in the direction in which the slide portion 115 is directed toward the relief portion 118 in the state where the slide portion 115 is in contact with the support face 116 in this manner, and the slide portion 115 is caused to approach the relief portion 118 (see FIG. 16).

Figure 19:
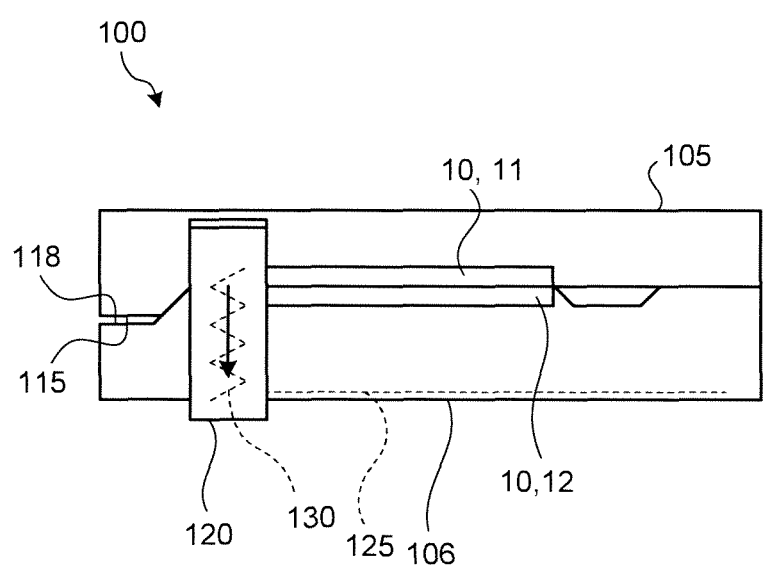
FIG. 19 is an explanatory diagram representing a closed state of the cover unit.

FIG. 19 is an explanatory diagram representing a closed state of the cover unit 105. When the cover unit 105 is slid with respect to the body unit 106 in the direction in which the slide portion 115 approaches the relief portion 118 and the slide portion 115 reaches the position where the relief portion 118 is formed, the cover unit 105 approaches the body unit 106 by the tension force of the spring 130. More specifically, the relief portion 118 is recessed with respect to the support face 116, and the force in the direction in which the both units approach each other is applied to the cover unit 105 and the body unit 106 by the tension force of the spring 130. Therefore, when the slide portion 115 reaches the position where the relief portion 118 is formed, the slide portion 115 formed so as to protrude in the direction of the body unit 106 moves in the direction of the relief portion 118 by the tension force of the spring 130, which causes the cover unit 105 to move in the direction of approaching the body unit 106.

The relief portion 118 is formed so that its difference in level with the support face 116 is greater than the height of the slide portion 115. Therefore, when the slide portion 115 reaches the position where the relief portion 118 is formed in the slide direction of the cover unit 105 and the slide portion 115 moves in the direction of the relief portion 118 in a protruding direction of the slide portion 115, the slide portion 115 does not contact the relief portion 118. In this case, the cover unit 105 comes into contact with the body unit 106 at the portion other than the slide portion 115.

Moreover, the relief portion 118 is positioned at the end of the body unit 106 on the opposite side to the end of the side where the open engaging portion 117 is positioned, and the slide portion 115 is also positioned at the end of the cover unit 105. Therefore, when the slide portion 115 reaches the position where the relief portion 118 is formed in the slide direction of the cover unit 105, the first image reading unit 11 provided in the cover unit 105 and the second image reading unit 12 provided in the body unit 106 are mutually opposed or faced to each other. Therefore, when the slide portion 115 reaches the position where the relief portion 118 is formed in the state where the original 90 is placed on the second image reading unit 12 and the slide portion 115 moves in the direction of the relief portion 118 which is the protruding direction of the slide portion 115, the original 90 is sandwiched between the first image reading unit 11 and the second image reading unit 12.

In this case, the cover unit 105 and the body unit 106 are applied with the spring force in the direction in which the both units approach each other by the tension force of the spring 130, and, therefore, the first image reading unit 11 and the second image reading unit 12 apply the pressing force to the sandwiched original 90 by the spring force. In the contact-type image reading apparatus 100 according to the second embodiment, the cover unit 105 is closed by sliding the cover unit 105 relatively with respect to the body unit 106 in the direction in which the slide portion 115 of the cover unit 105 approaches the relief portion 118 of the body unit 106.

When the cover unit 105 is closed, the cover unit 105 is slid so that the slide portion 115 moves up to the portion where the relief portion 118 is formed. The support face 116 and the relief portion 118 are connected to each other with the gentle slope. Therefore, when the cover unit 105 is closed, the cover unit 105 is slid, and when the slide portion 115 thereby reaches the slope portion connected to the relief portion 118, the slide portion 115 moves in the direction of the relief portion 118 along the slope portion by the tension force of the spring 130, and the cover unit 105 and the body unit 106 are closed. More specifically, the cover unit 105 and the body unit 106 are provided so as to generate the force in the direction of closing the both units, making the closed state in the relative positional relationship between the cover unit 105 and the body unit 106 in the opening/closing direction, or the state in which the slide portion 115 reaches the position where the relief portion 118 is provided, as a reference state, when the moving amount is a predetermined value or less compared to the reference state.

When the images of the original 90 are read, the cover unit 105 is closed as described above and the pressing force is applied to the original 90, and the original 90 is read in the state where the original 90 is in close contact with the first image reading unit 11 and the second image reading unit 12. In the contact-type image reading apparatus 100 according to the second embodiment, similarly to the case where the images of the original 90 are read by the contact-type image reading apparatus 1 according to the first embodiment, the image reading units 10 are controlled by the main control board 60 in the state where the original 90 is in close contact with the image reading units 10, thereby reading the images.

The contact-type image reading apparatus 100 as explained above is configured that the cover unit 105 provided with the first image reading unit 11 and the body unit 106 provided with the second image reading unit 12 can be opened and closed by performing the linear motion. Thus, when the cover unit 105 is opened, the cover unit 105 and the body unit 106 can be relatively opened without increasing the size in the direction orthogonal to the surfaces for reading the images of the original 90 in the image reading units 10 or in the thickness direction of the contact-type image reading apparatus 100. Therefore, even if an abundant space cannot be provided in this direction, or the thickness direction of the contact-type image reading apparatus 100, around the contact-type image reading apparatus 100, the cover unit 105 and the body unit 106 can be opened, and the original 90 can be placed between the both units. As a result, the easiness at the time of reading both sides of the original 90 can be more reliably improved.

The cover unit 105 and the body unit 106 are disposed so as to generate the force in the direction in which the both units are closed, when the relative relationship between the cover unit 105 and the body unit 106 in the opening/closing direction according to the linear motion is such that a moving amount from the closed state is a predetermined value or less. The force for closing the both units are generated by the tension force of the spring 130 and by the functions of portions such as the slide portion 115, the support face 116, and the relief portion 118. Thus, when the original 90 is sandwiched between the cover unit 105 and the body unit 106, the pressing force can be generated between the original 90 and the two image reading units 10. Therefore, when the images of the original 90 are read by the image reading units 10, the images can be read in the state where the original 90 is in close contact with the image reading units 10. As a result, the original 90 can be more clearly read.

In the contact-type image reading apparatus 1 according to the first embodiment, opening and closing between the cover unit 5 and the body unit 6 are performed by the operation of the hinges 8, while in the contact-type image reading apparatus 100 according to the second embodiment, the opening and closing are performed by relatively sliding between the cover unit 105 and the body unit 106. However, the opening and closing between the cover unit 5, 105 and the body unit 6, 106 may be performed by using any other structure or method. As for opening and closing between the cover unit 5, 105 and the body unit 6, 106 respectively provided with the image reading units 10, any method is acceptable if the method, when the cover unit 5, 105 and the body unit 6, 106 are relatively opened, is capable of setting the original 90 therebetween or taking it out thereof, and if the method, when the cover unit 5, 105 and the body unit 6, 106 are relatively closed, is capable of causing the image reading units 10 to be positioned on both sides of the original 90 to sandwich the original 90 between the two image reading units 10.

Moreover, in the contact-type image reading apparatus 1 according to the first embodiment, only the first image reading unit 11 is mounted on the cover unit 5 through the cushion materials 38, however, the second image reading unit 12 may also be mounted on the body unit 6 through the cushion materials 38. Likewise, the first image reading unit 11 and the second image reading unit 12 included in the contact-type image reading apparatus 100 according to the second embodiment may be provided with the floating structure in which these units are also mounted on the cover unit 105 and the body unit 106 through the cushion materials 38, respectively. Furthermore, in the contact-type image reading apparatus 1 according to the first embodiment, when the first image reading unit 11 is to be provided with the floating structure, it is provided by using the image-reading-unit mounting portion 35 and the cushion materials 38. However, when the first image reading unit 11 is to be provided with the floating structure, it may be provided with any structure other than this structure. At least one of the first image reading unit 11 and the second image reading unit 12 is simply mounted on the cover unit 5, 105 or the body unit 6, 106 through an elastic member such as the cushion materials 38. In this way, by mounting the image reading unit 10 thereon through the elastic member, the original 90 can be brought into close contact with the image reading units 10 at the time of reading the images of the original 90 by the image reading units 10, thus the images of the original 90 are read more clearly.

In the contact-type image reading apparatuses 1 and 100 according to the first and the second embodiments, the cover units 5 and 105 are provided as the first body unit and the body units 6 and 106 are provided as the second body unit. However, the first body unit and the second body unit may be provided with any components other than the cover unit 5, 105 and the body unit 6, 106. More specifically, the first body unit does not need to be provided as the cover of the second body unit, and thus, the relationship between the first body unit and the second body unit is not limited to the relationship between the cover unit 5, 105 and the body unit 6, 106 of the contact-type image reading apparatus 1, 100 according to the first or the second embodiment.

According to the present invention, since the images on both sides of the original can be almost simultaneously read by the two image reading units, operability at the time of reading the both sides of the original can be improved.

Although the invention has been described with respect to specific embodiments for a complete and clear disclosure, the appended claims are not to be thus limited but are to be construed as embodying all modifications and alternative constructions that may occur to one skilled in the art that fairy fall within the basic teaching herein set forth.

What is claimed is:

1. A contact-type image reading apparatus comprising:
   two image reading units each of which includes a two-dimensional contact-type area sensor that includes a light-receiving/emitting layer having light-receiving elements arranged two-dimensionally on a transparent glass substrate and spaced apart from each other, and light-emitting portions arranged around the light-receiving elements, for reading an image on an original in two-dimensional directions without conveying the original and without mechanically scanning the original;
   a first body unit that includes one of the two image reading units as a first image reading unit;
   a second body unit that includes the other image reading unit as a second image reading unit, the second body unit being disposed so as to be openable and closable with respect to the first body unit for sandwiching the original between the first body unit and the second body unit when the second body unit is closed with respect to the first body unit; and
   an elastic member arranged between the first body unit and the first image reading unit so that the first image reading unit is mounted on the first body unit through the elastic member, wherein
   the second body unit is closed with respect to a surface where the first image reading unit is provided in the first body unit when the second body unit is closed with respect to the first body unit,
   the second image reading unit is disposed to face the first image reading unit when the second body unit is closed with respect to the first body unit,
   the second image reading unit is arranged to allow the original to be placed thereon when the second body unit is opened with respect to the first body unit, and
   the elastic member is arranged to generate a pressing force between the original and the two image reading units, when the first body unit and the second body unit are closed to sandwich the original therebetween, to make the original come into close contact with both the first image reading unit and the second image reading unit.

2. The contact-type image reading apparatus according to claim 1, wherein the following relationship is satisfied:

$$(a/x) < k < \{(F-a)/x\}$$

where a is a force required to press the original sandwiched between the fist body unit and the second body unit and to make the original flat, k is a spring constant of the elastic member, x is a maximum amount of deformation of the elastic member, and F is a force applied to the first body unit or to the second body unit in order to make the first body unit and the second body unit in an closed state.

3. The contact-type image reading apparatus according to claim 1, wherein the first body unit and the second body unit are connected to each other by a hinge so as to be relatively openable and closable.

4. The contact-type image reading apparatus according to claim 3, wherein the hinge includes a rotation axis parallel to respective surfaces for reading images on the original in the two image reading units.

5. The contact-type image reading apparatus according to claim 4, wherein when an opening/closing angle between the first body unit and the second body unit is a predetermined value or less, the hinge generates torque in a direction of closing the first body unit and the second body unit.

6. The contact-type image reading apparatus according to claim 1, wherein the first body unit and the second body unit are opened and closed by performing a relative linear motion in parallel to respective surfaces for reading images of the original in the two image reading units.

7. The contact-type image reading apparatus according to claim 6, wherein a relative positional relationship between the first body unit and the second body unit in an opening/closing direction is determined based on a closed state as a reference state, and when a moving amount based on the closed state between the first body unit and the second body unit is a predetermined value or less, a force in a direction of closing the first body unit and the second body unit is generated therebetween.

* * * * *